US008260894B2

(12) United States Patent
 Chun

(10) Patent No.: US 8,260,894 B2
(45) Date of Patent: Sep. 4, 2012

(54) METHOD FOR BALANCING LOAD AMONG SUBSYSTEMS IN COMMUNICATION NETWORK SYSTEM OF BUS NETWORK STRUCTURE

(75) Inventor: Kyoung Wook Chun, Seoul (KR)

(73) Assignee: NHN Corporation, Seongnam-si (KR)

( * ) Notice: Subject to any disclaimer, the term of this patent is extended or adjusted under 35 U.S.C. 154(b) by 508 days.

(21) Appl. No.: 11/721,571

(22) PCT Filed: Dec. 16, 2005

(86) PCT No.: PCT/KR2005/004349
§ 371 (c)(1),
(2), (4) Date: Jun. 13, 2007

(87) PCT Pub. No.: WO2006/065101
PCT Pub. Date: Jun. 22, 2006

(65) Prior Publication Data
US 2008/0114895 A1      May 15, 2008

(30) Foreign Application Priority Data
Dec. 17, 2004   (KR) .................. 10-2004-0107498

(51) Int. Cl.
 *G06F 15/16* (2006.01)
 *G01R 31/08* (2006.01)
(52) U.S. Cl. ...................................... 709/223; 370/252
(58) Field of Classification Search ........... 709/223–235
 See application file for complete search history.

(56) References Cited

U.S. PATENT DOCUMENTS

| 5,341,477 | A  * | 8/1994  | Pitkin et al. ............... 709/226 |
| 6,633,899 | B1 * | 10/2003 | Coward ...................... 709/202 |
| 6,732,175 | B1   | 5/2004  | Abjanic |
| 6,757,291 | B1   | 6/2004  | Hu |
| 2003/0101265 | A1 | 5/2003  | Dantzig et al. |
| 2003/0105800 | A1 * | 6/2003 | Cullen ........................ 709/201 |

(Continued)

FOREIGN PATENT DOCUMENTS

EP     0971298 A1 *  1/2000
(Continued)

OTHER PUBLICATIONS

Mor Harchol-Balter and Allen B. Downey; Exploiting Process Lifetime Distributions for Dynamic Load Balancing; 1997; ACM; 15-3; 253-285.*

*Primary Examiner* — Haresh N Patel
*Assistant Examiner* — Evans Desrosiers
(74) *Attorney, Agent, or Firm* — H.C. Park & Associates, PLC

(57) ABSTRACT

A method for adjusting a load among subsystems in a communication network system having a bus network structure, wherein: the communication network system includes a broker processing a message routing, a connector, and a plurality of services which is a communicable terminal node connected to the broker via the connector, and the method includes the steps of: connecting all brokers of the communication network system to each other in a full mesh topology, the broker being a module setting up a routing path or a connection with the connector, to process the message routing; maintaining a broker list recording a network address of each broker in the connector; the connector receiving a service registration message from the service, randomly selecting one broker from the broker list, and transmitting a connection request message.

22 Claims, 19 Drawing Sheets

U.S. PATENT DOCUMENTS

| | | | |
|---|---|---|---|
| 2005/0088976 A1* | 4/2005 | Chafle et al. | 370/252 |
| 2005/0108418 A1* | 5/2005 | Bedi et al. | 709/232 |

FOREIGN PATENT DOCUMENTS

| | | |
|---|---|---|
| EP | 971298 A1 * | 1/2000 |
| JP | 10065704 A * | 3/1998 |
| JP | 2000-259595 | 9/2000 |
| JP | 2002-64488 | 2/2002 |
| JP | 2003-298635 | 10/2003 |
| JP | 2004-274702 | 9/2004 |
| KR | 2004-0010038 | 1/2004 |
| WO | 03/107698 | 12/2003 |

* cited by examiner

PRIOR ART

MRHeader

MRMSGHeader

MRCMPHeader

METHOD FOR BALANCING LOAD AMONG SUBSYSTEMS IN COMMUNICATION NETWORK SYSTEM OF BUS NETWORK STRUCTURE

CROSS REFERENCE TO RELATED APPLICATIONS

This application is a U.S. National Phase Application of International Application PCT Application No. PCT/KR2005/004349 filed on Dec. 16, 2005, which claims the benefit of priority from Korean Patent Application No. 10-2004-0107498 filed on Dec. 17, 2004. The disclosures of International Application PCT Application No. PCT/KR2005/004349 and Korean Patent Application No. 10-2004-0107498 are incorporated herein by reference.

TECHNICAL FIELD

The present invention relates to a method for adjusting a load among subsystems in a communication network system having a bus network structure. More particularly, the present invention relates to a method for adjusting a load balance between each broker in a bus network structure in which a broker processing a message routing is connected with at least one service contained in one process via one connector and all brokers of a network are connected to each other in a full mesh topology.

BACKGROUND ART

In the conventional art, all game servers providing game service are connected to each other in a mesh topology. FIG. 1 is a diagram illustrating network connections between game servers according to the conventional art.

According to the conventional art illustrated in FIG. 1, every time new game servers are added, there is a surprising increase in a number of connections from the viewpoint of the entire network. FIG. 2 is a diagram illustrating network connections between game servers which may occur as a number of game servers continuously increases in the conventional art.

According to the conventional art in which game servers are connected to each other with mesh topology, as described above, when a number of game servers increases, the connection structure thereof also becomes very complicated. As a result, a game server may not be able to be extended according to an increase of game users. Also, when a connection between game servers is globally extended, the management thereof also becomes difficult.

The more a number of partner servers connect to one server, the more the total number of connections geometrically increases. Generally, in the conventional art, one game server is connected to a login server, a ranking server, and a database server. In this instance, the game server is additionally grouped with a channel list server and a notice server as one multicast group. Accordingly, a substantial number of connections in the entire network greatly exceeds a number of connections between game servers. Also, its management is very difficult.

Consequently, a new communication network structure which can deviate from a network structure according to the conventional art connecting all game servers in a mesh topology, simplify and easily manage a connection structure between servers, and efficiently extend services is needed.

Also, a method capable of effectively adjusting a load balance between each subsystem in a new communication network structure is needed.

DISCLOSURE OF INVENTION

Technical Goals

The present invention is conceived to solve the aforementioned problems in the conventional art, and the present invention provides a load adjusting method in which a load balance between brokers is automatically adjusted by selecting a broker to be registered with a service via a connector on the basis of each broker's current load and load limit, and dynamically moving services connected to each connector to other brokers, in the case of normal and abnormal termination of a broker, in a new communication network system having a simple connection structure between servers by using a bus network structure.

The present invention also provides a load adjusting method which can support service extendibility and performance enhancement, easily maintain and manage a connection structure, and construct a communication network system, by effectively distributing a load among subsystems in the communication network system having a simple connection structure between servers by using a bus network structure.

The present invention also provides a load adjusting method in which a communication network structure can deviate from a network structure according to the conventional art connecting all game servers in a mesh topology, simplify and easily manage a connection structure between servers, and efficiently extend services.

Technical Solutions

To achieve the above objectives and solve the aforementioned problems in the conventional art, according to an aspect of the present invention, there is provided a method for adjusting a load among subsystems in a communication network system having a bus network structure, wherein: the communication network system includes a broker processing a message routing, a connector, and a plurality of services which is a communicable terminal node connected to the broker via the connector, and the method includes the steps of: connecting all brokers of the communication network system to each other in a full mesh topology, each broker being a module setting up a routing path or a connection with the connector, to process the message routing; maintaining a broker list recording a network address of each broker in the connector; the connector receiving a service registration message from the service, randomly selecting one broker from the broker list, and transmitting a connection request message; and the selected broker receiving the connection request message, determining whether to connect to the connector by considering its current load and load limit.

According to another aspect of the present invention, there is provided a load adjusting method including the steps of: connecting all brokers of the communication network system to each other in a full mesh topology, each broker being a module setting up a routing path or a connection with the connector, to process a message routing; a first broker that is normally terminated from the communication network system selecting a second broker that is one of the all brokers; transmitting a connection re-setup message requesting a re-setup of a connection with the second broker, to a connector connected to the first broker; and the connector receiving the connection re-setup message, setting up the connection with the second broker, and transmitting a service registration message for registering a service connected to the connector, to the second broker.

According to still another aspect of the present invention, there is provided a load adjusting method including the steps of: connecting all brokers of the communication network system to each other in a full mesh topology, each broker being a module setting up a routing path or a connection with the connector, to process a message routing; a second broker detecting a first broker abnormally terminated from the communication network system, in which the second broker is one of the each broker; the second broker increasing its load limit and setting up a connection with at least one portion of connectors among connectors connected to the first broker; and the second broker updating its routing information according to the setup of the connection and transmitting the updated routing information to the each broker.

According to yet another aspect of the present invention, there is provided a load adjusting method including the steps of: connecting all brokers of the communication network system to each other in a full mesh topology, the broker being a module setting up a routing path or a connection with the connector, to process a message routing; maintaining a broker list recording a network address of each broker in the connector; the connector detecting an abnormally terminated first broker from the communication network system; deleting a network address of the first broker from the broker list and updating the same; and randomly selecting a second broker from the updated broker list, setting up a connection with the second broker, and transmitting a service registration message for registering a service connected to the connector, to the second broker.

BEST MODE FOR CARRYING OUT THE INVENTION

Hereinafter, a communication network system according to the present invention and a method of adjusting a load among subsystems in the communication network system will be described in detail with reference to the accompanying drawings.

Figure 3:
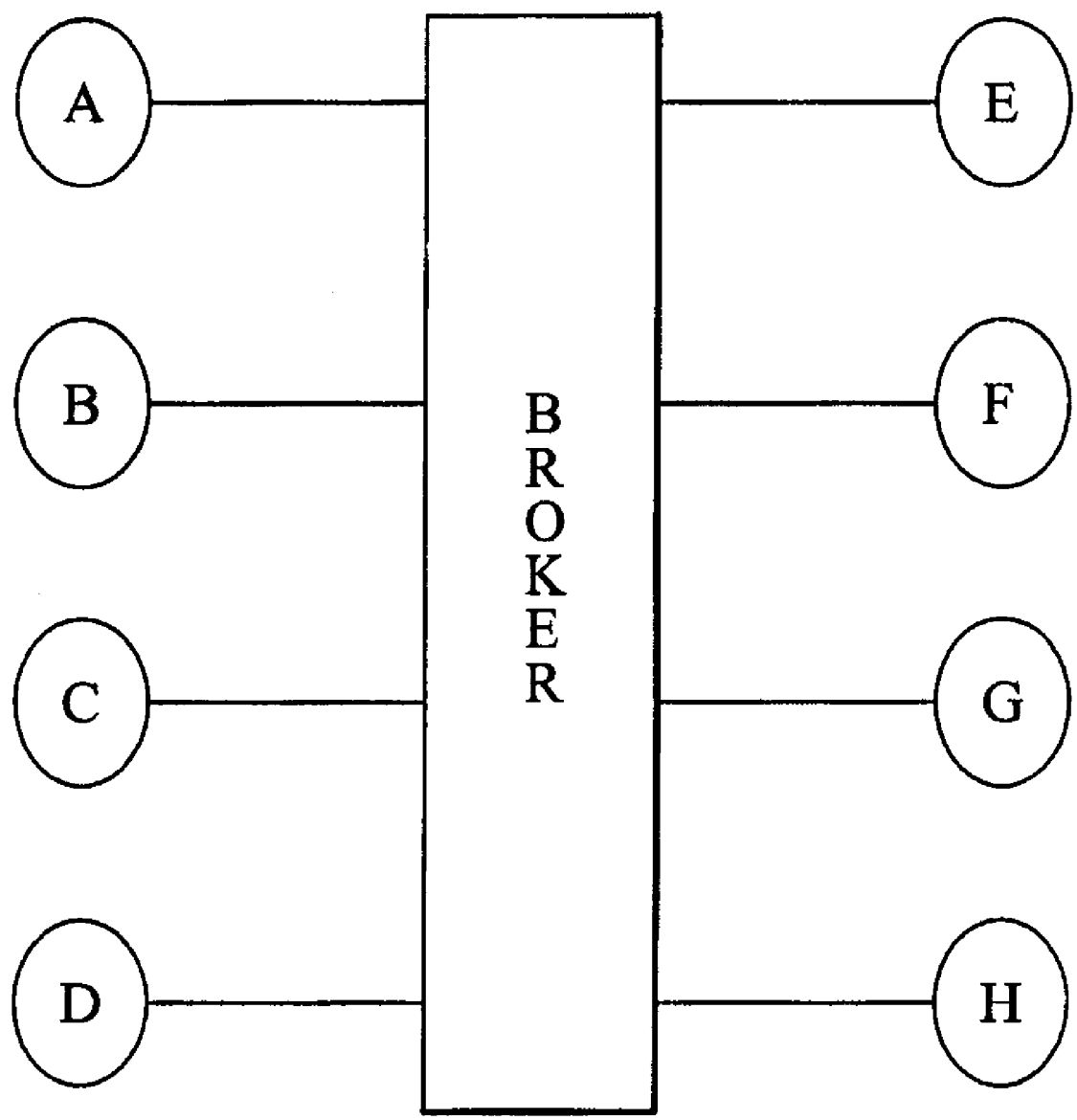
FIG. 3 is a schematic diagram illustrating a bus network structure according to the present invention.

FIG. 3 is a schematic diagram illustrating a bus network structure according to the present invention.

Figure 1:
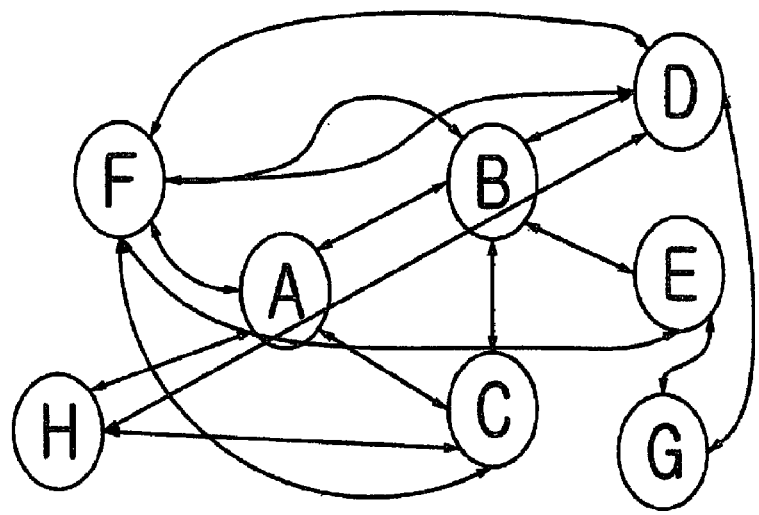
FIG. 1 is a diagram illustrating network connections between game servers according to conventional art.

As illustrated in FIG. 1, in the conventional art, all game servers are connected to each other in a mesh topology. However, in the bus network structure according to the present invention, as illustrated in FIG. 3, all servers are connected to each other in a bus structure. Accordingly, the connection structure between servers is very simplified.

Figure 4:
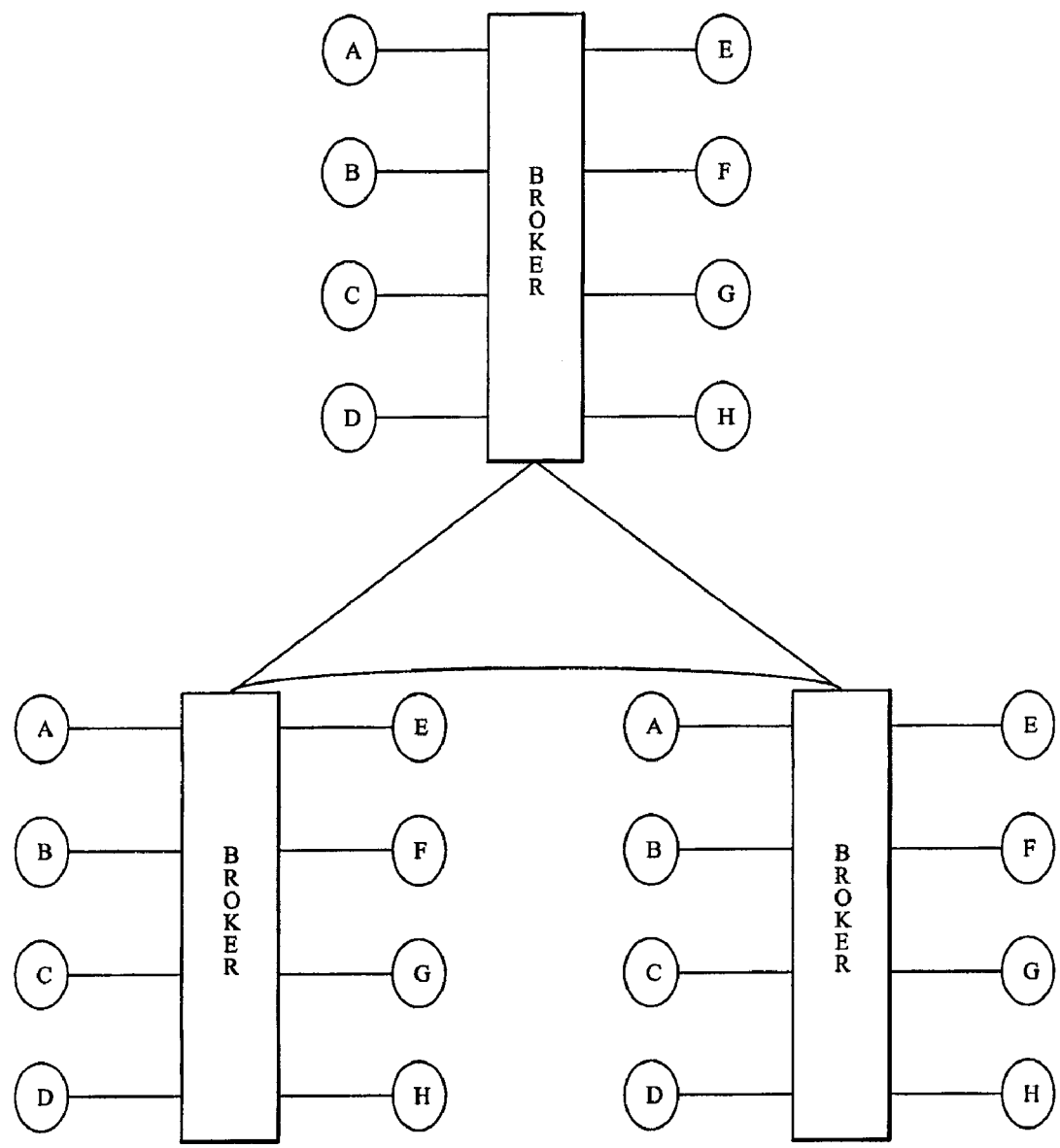
FIG. 4 is a schematic diagram illustrating a connection of a communication network system in a bus network structure according to the present invention.

FIG. 4 is a schematic diagram illustrating a connection of a communication network system in a bus network structure according to the present invention.

Figure 2:
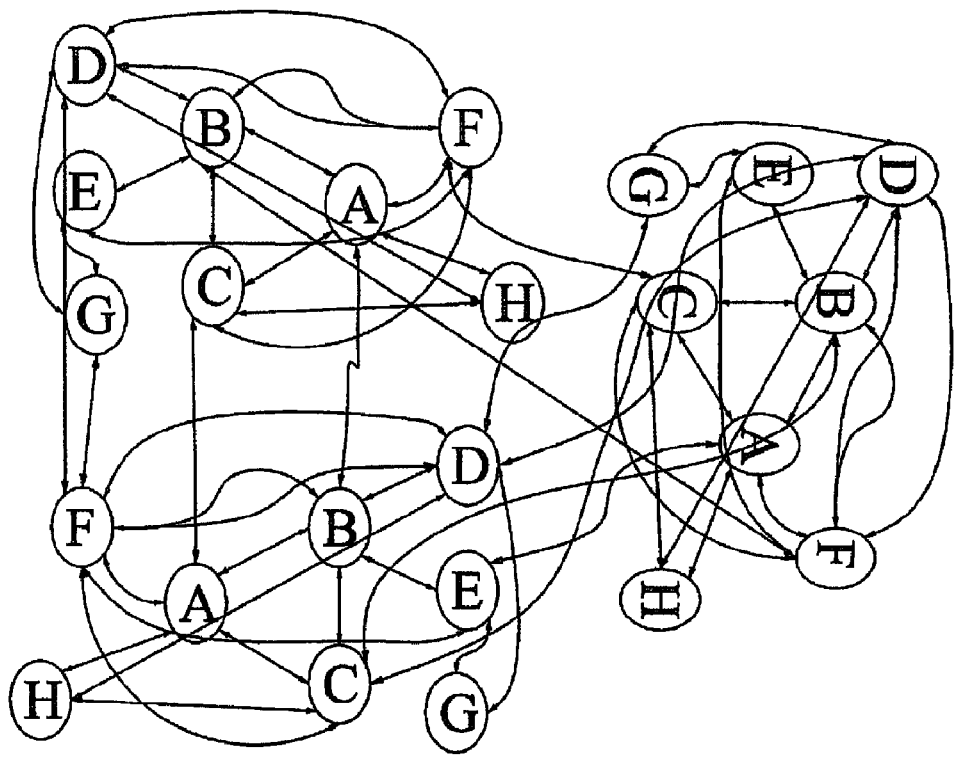
FIG. 2 is a diagram illustrating network connections between game servers which may occur as a number of game servers continuously increases in the conventional art.

According to the conventional art illustrated in FIG. 1, as illustrated in FIG. 2, every time new game servers are added, there is a surprising increase in a number of connections from the viewpoint of the entire network. On the other hand, as illustrated in FIG. 4, in the bus network structure according to the present invention, each server maintains a connection with one broker. Also, in the case of extending the network, an intermediate connection is performed via brokers. Accordingly, although a server is additionally connected, a number of connections is not significantly increased from the viewpoint of the entire network. Accordingly, the communication network system adopting the bus network structure of the present invention, as illustrated in FIGS. 3 and 4, may easily link a new service and also may easily maintain and manage the linked service.

Figure 5:
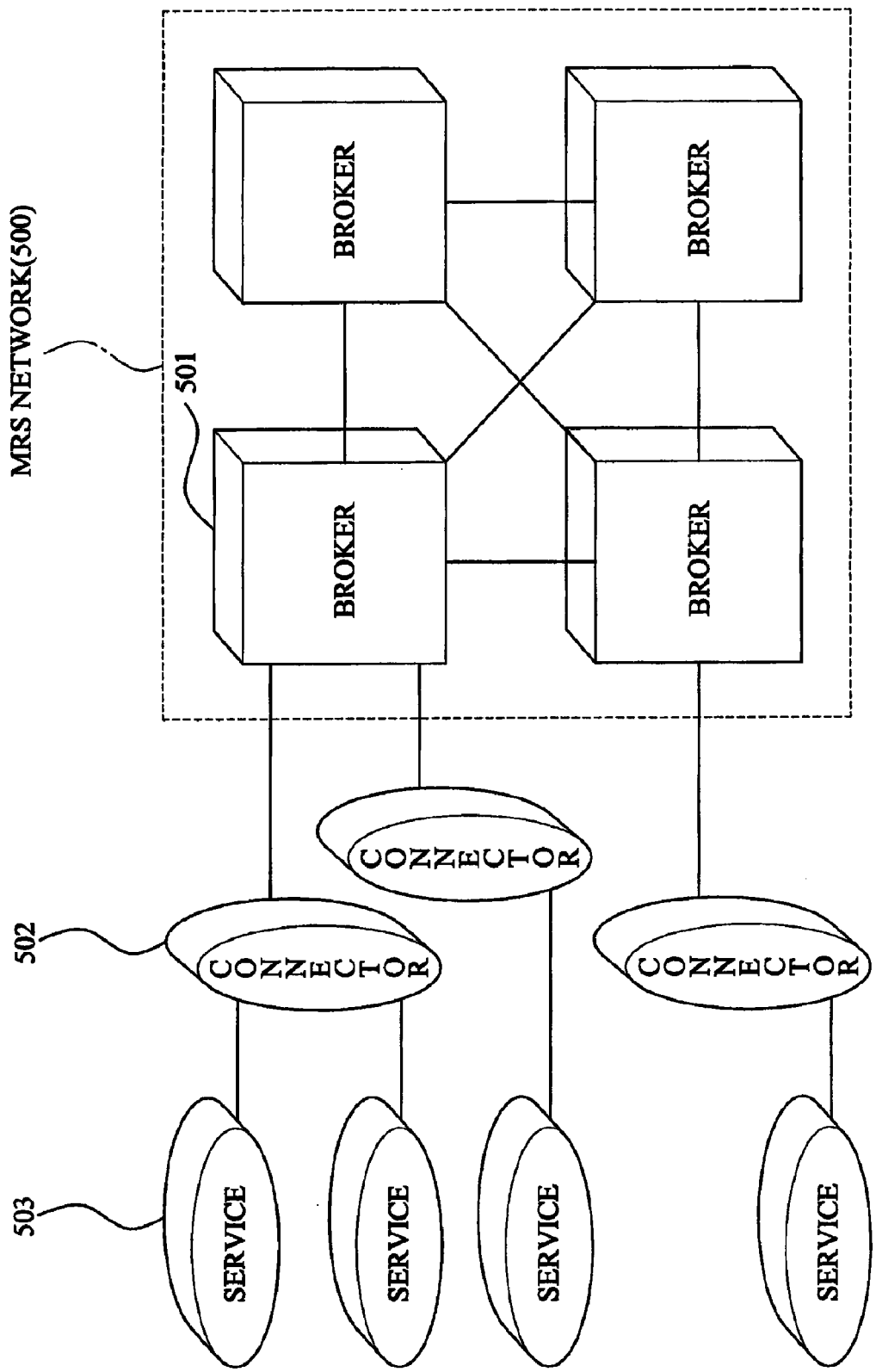
FIG. 5 is a diagram illustrating a connection of a broker, a connector, and a service in a communication network system according to the present invention.

FIG. 5 is a diagram illustrating a connection of a broker, a connector, and a service in a communication network system according to the present invention.

As illustrated in FIG. 5, the communication network system according to the present invention includes a broker 501 processing a message routing, a connector 502 and a plurality of services 503 connected to the broker 501 via the connector 502.

The service 503 is a communicable terminal node. Each service 503 is connected to the broker 501 via one connector 502.

Also, the connector 502 is a module for mediating a connection between the broker 501 and the service 503. Each connector 502 is connected to only one broker 501.

According to an embodiment of the present invention, the connector 502 and the service 503 are contained in an identical process. Only one connector 502 is contained in one process and at least one service 503 is contained in one process. Namely, only one connector 502 exists for each process. Also, the connector 502 may mediate a connection between all services 503 and the broker 501. In this instance, all services 503 exist in a process containing the connector 502.

According to the present embodiment, a connector and a process are matched 1:1. Accordingly, a communication network system may be unified. Also, inefficient routing, which may occur when connecting the services 503 contained in different processes to the same broker 501 via one connector 502, may be prevented. Also, complexity in transmitting/receiving data may be prevented.

The broker 501 is a module for setting up a routing path or the connection with the connector 502 to efficiently process the message routing. The brokers 501 are connected to each other in a full mesh topology.

In the present specification, a network formed by connecting the brokers 501 in a full mesh topology is defined as a message routing server (MRS) network 500. Accordingly, the MRS network 500 is a network service platform for efficiently transmitting/receiving a message between various types of communication systems. The connector 502 is a module for providing a programming interface for transmitting/receiving a message by using the MRS network 500. The service 503 utilizes the MRS network 500 via the programming interface provided by the connector 502.

As illustrated in FIG. 5, in the communication network system according to the present invention, there is only one effective connection between the broker 501 and the connector 502. In the case of communicating with the broker 501, each service 503 sequentially communicates with the broker 501 via said only one connection.

Figure 6:
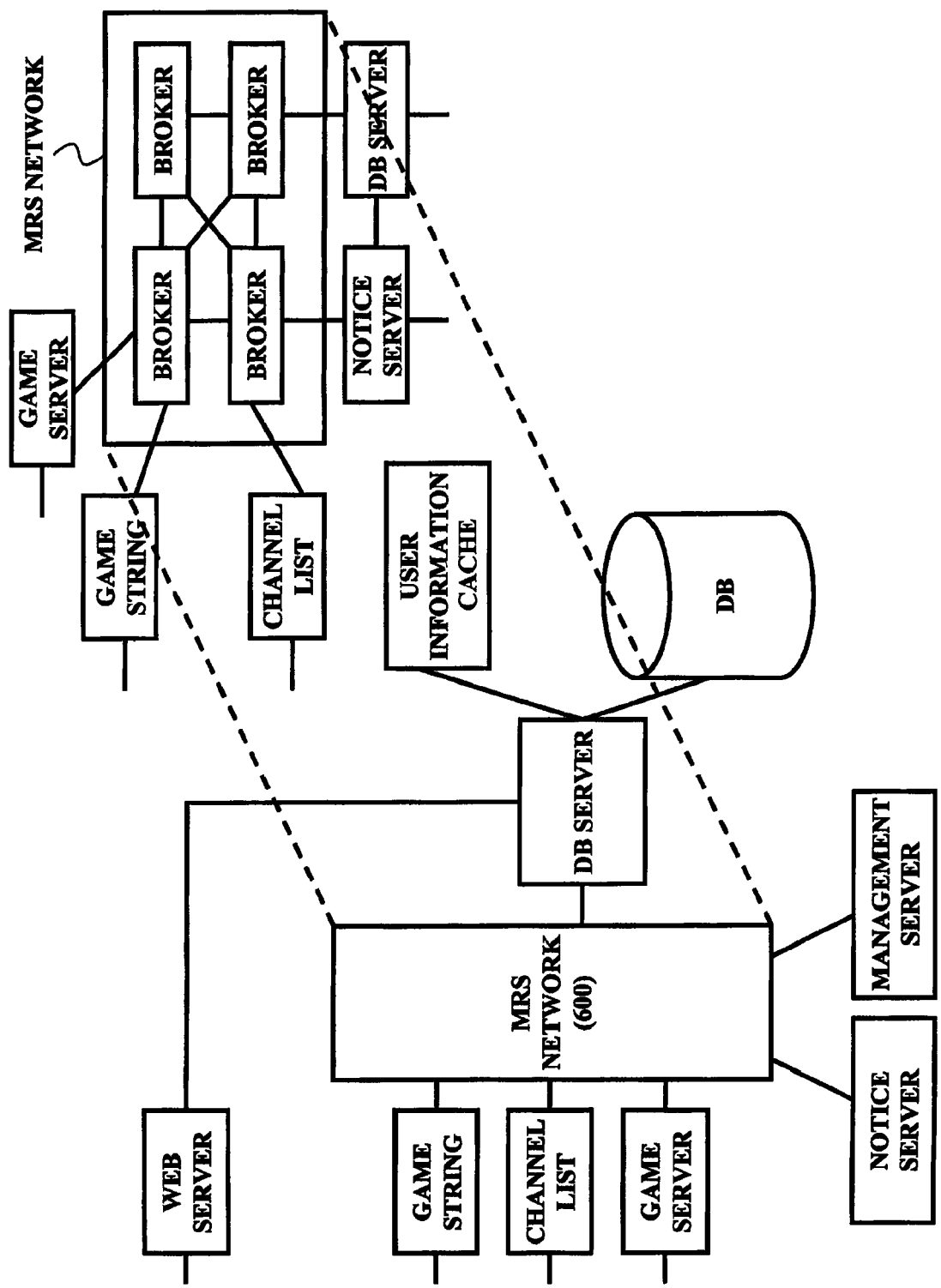
FIG. 6 is a diagram illustrating an example of various types of servers connected to each other via a message routing server (MRS) network according to the present invention.

FIG. 6 is a diagram illustrating an example of various types of servers connected to each other via an MRS network according to the present invention.

As illustrated in FIG. 6, various types of game related servers such as a game string server, a channel list server, a game server, a notice server, a management server, a database server, etc., are connected to each other via an MRS network 600. Each server maintains only one connection with any one of a plurality of brokers which are connected to each other in a full mesh topology.

In the conventional art, all game related servers are connected to each other in a full mesh topology. Accordingly, the more a number of partner servers connected to one server, the more the total number of connections geometrically increases. On the other hand, according to the present invention, as illustrated in FIG. 6, each server maintains a connection with only one broker. Also, in the case of extending the network, an intermediate connection is performed via brokers. Accordingly, although a server is additionally connected, a number of connections is not significantly increased in the viewpoint of the entire network.

Figure 7:
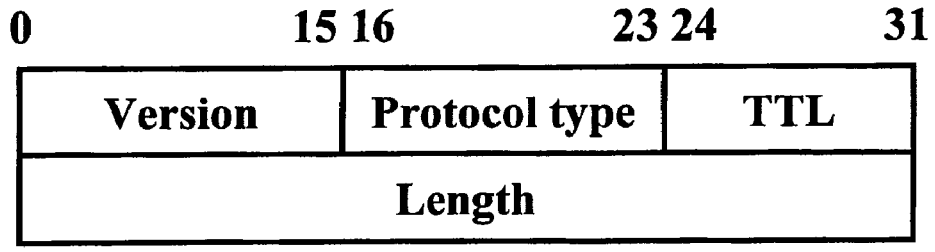
FIG. 7 is a diagram illustrating a structure of a message used in a communication network system according to the present invention.
Figure 7:
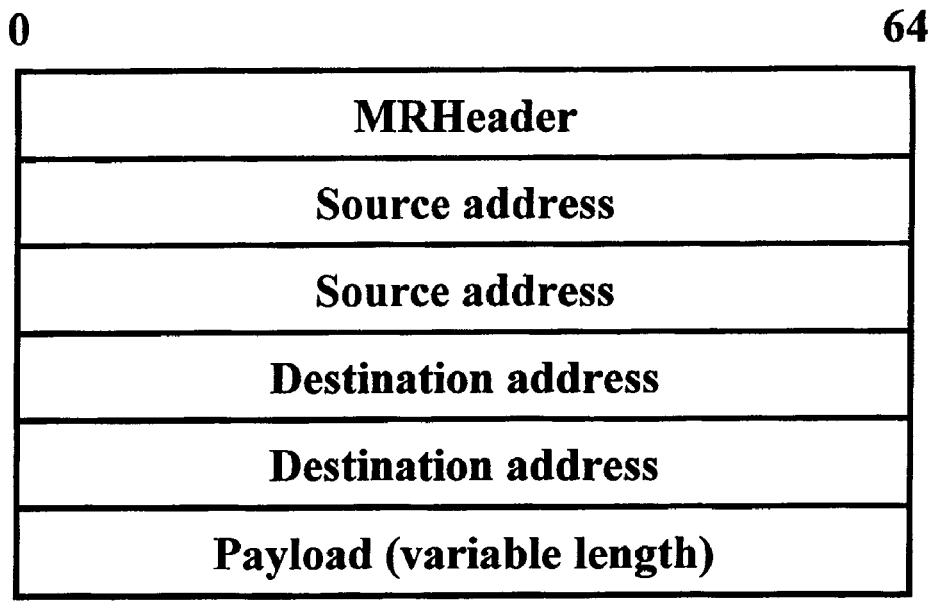
Figure 7:
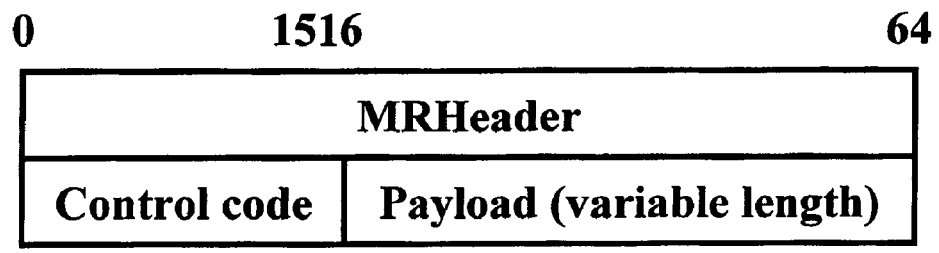

FIG. 7 is a diagram illustrating a format of a message used in a communication network system according to the present invention. Referring to FIG. 7, the format of transmitting/receiving a message between a connector and a broker, and between brokers, which are subsystems of the communication network system according to the present invention, will be described.

In the present specification, the structure of the message will be described based on a data type which is widely used in Windows, rather than an octet notation, as a data type for defining a field of each message. In this case, Windows data type and octet notation is mapped, such as "BYTE: octet(8)", "WORD: octet(16)", and "DWORD: octet(32)".

Messages used in the communication network system according to the present invention are grouped into MRMSGHeader and MRCMPHeader. Each message is divided into fields, of which one is a common field containing MRHeader, and remaining fields are specified fields of each message.

MRHeader is message header information that all messages exchanged in the communication network system, according to the present invention, should contain as a common field. An MRHeader message may not be used alone. The MRHeader message must be transmitted/received after inserting a valid value in a protocol type field and appending additional message information to the MRHeader.

TABLE 1

| Type | Name | Description |
| --- | --- | --- |
| WORD | Version | Indicates version information of a message. Indicates a major version in an upper byte and a minor version in a lower byte. |
| BYTE | Protocol type | This value may contain two values, PT_MESSAGE and PT_MRCMP. PT_MESSAGE gives notice that fields coming after MRHeader is in an MRMSGHeader format. Also, PT_MRCMP gives notice that fields coming after MRHeader is in an MRCMPHeader format. |
| BYTE | TTL | This means time to live. A message transmitted/received in a communication network according to the present invention decrements a TTL value by one every time a broker of an MRS network processes routing, and in the case of the TTL value being 0, does not process routing and generates a transmission error. |
| DWORD | Length | Means the length of MRHeader and MRMSGHeader coming thereafter, in other words, the length of the entire message containing MRCMPHeader. |

A transferred message in the MRMSGHeader format has a structure for transferring a payload value designated by a service between a plurality of services connected to an MRS network.

In this case, a source address and a destination address are described in the message transmitted/received in the structure of MRMSGHeader. The source address is an address of a transmitter transmitting a message and the destination address is an address of a receiver receiving the message. Also, the MRS network tries routing on the basis of connection information and the destination address. Each field will be described in Table 2 below.

TABLE 2

| Type | Name | Description |
|---|---|---|
| MRHeader (8 bytes) | Not defined | The aforementioned MRHeader structure. |
| MRADDRESS (16 bytes) | Source address | An address of a message transmitter. Also, MRADDRESS is a data type for defining a source address and destination address field of the MRMSGHeader. |
| MRADDRESS (16 bytes) | Destination address | An address of a message receiver. |
| Not defined | Not defined | A user defined message. The length in an MRHeader format of a corresponding message has to contain the total length from MRHeader through a payload defined by a user. |

A transferred message in the format of MRCMPHeader is a message defined for transmitting/receiving a signal between a connector and a broker, and between brokers. In this instance, the connector and the broker are subsystems of the communication network system according to the present invention. Each field will be described in Table 3 below.

TABLE 3

| Type | Name | Description |
|---|---|---|
| MRHeader (8 bytes) | Not defined | The aforementioned MRHeader structure. |
| WORD | Control code | A signal command to be transmitted/received. An upper byte functions to divide a role of the signal and a lower byte functions as a divider in dividing the purpose. |
| Not defined | Not defined | A field for adding variable length associated with a control code. This field may be transformed into various lengths according to the content of the control code. |

Hereinafter, an address system used in the present invention will be described.

In the case of designating a source address and a destination address to transmit/receive data using an MRS network, the present invention utilizes a new address system according to the present invention, not an IP address. The MRS network supports three types of addresses, which are unicast, anycast, and multicast, to identify a particular service. Each address is in the form of a cast type and an address in any one of the three address types, and has the length of 16 bytes.

In the case of an online game, a plurality of service instances interacts and communications between the service instances also increase. However, in the conventional art, a network address is not allocated to the service instances. Namely, one process having an identical network address contains many service instances and processes a large number of communications between service instances.

Accordingly, the present invention utilizes a new address system, allocates a single address to each service instance and efficiently processes a communication between service instances. In this case, a game server does not need to distribute messages to each of a plurality of game centers. Accordingly, management cost may be significantly reduced.

Also, the present invention supports three types of addresses, such as unicast, anycast and multicast. Accordingly, anycast or multicast may be applied to group instances operating in physically separated servers as one anycast or multicast group.

Figure 8:
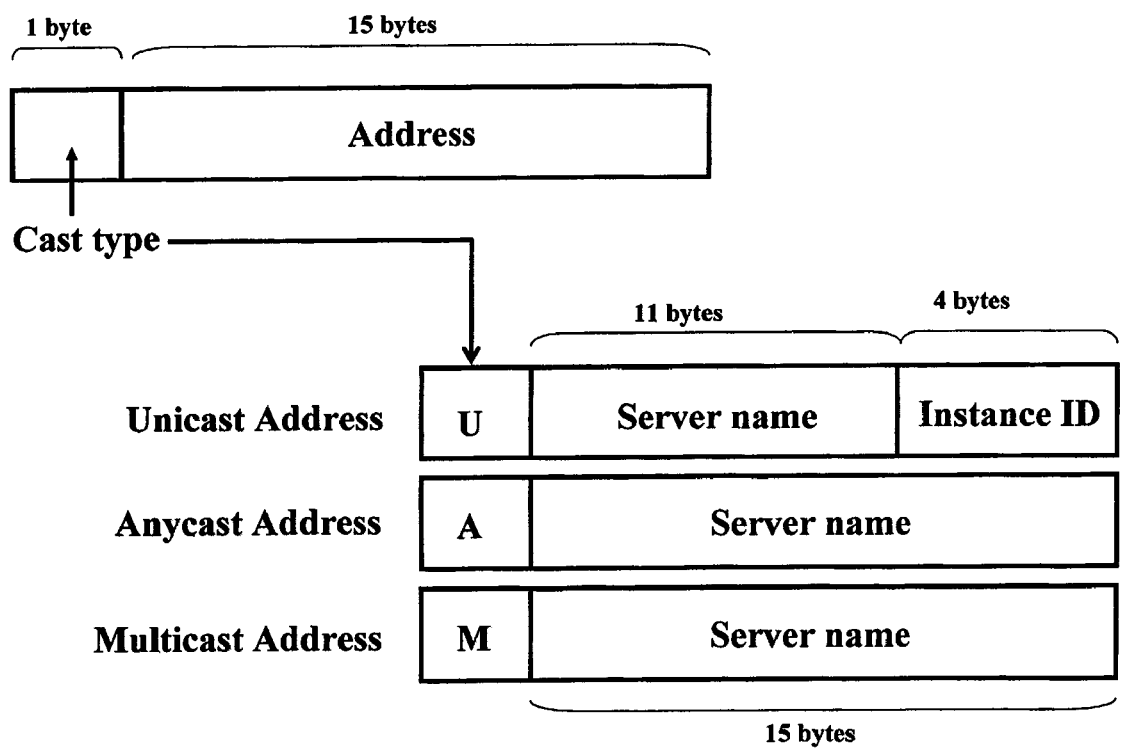
FIG. 8 is a diagram illustrating an address system according to the present invention.

FIG. 8 is a diagram illustrating an address system according to the present invention.

In FIG. 8, a cast type is the type of an address and has one value from among CT-UNICAST, CT_MULTICAST and CT_ANYCAST.

The unicast address is a unique address capable of identifying all services using an MRS network. Also, the unicast address is in the form of a server name and an instance ID. In this instance, the server name identifies a server activating a particular service in the entire network. The instance ID uniquely identifies a corresponding service in the same server.

The server name is a unique value of 11 bytes indicating a computer hardware server in which a service using the MRS network is activated. A server name may be a unique value of 11 bytes identifying a server, in which a service is activated, within the entire network.

The instance ID is a unique identifier identifying a service in the same server. As an example, values of 1 to 65535 are reserved for when a fixed unicast address is required. Values after 65536 may be dynamically allocated and used within the server.

The unicast address described above may be arranged as Table 4 below.

TABLE 4

| Type | Name | Description |
|---|---|---|
| BYTE | Cast type | In the case of a unicast address, always CT_UNICAST. |
| DWORD | Instance ID | In the case of requiring a plurality of addresses in a corresponding computer, each address may be separated by using an instance No. 0x0000 to 0xffff as reserved numbers for the instance ID. |
| BYTE (x11) | Server name | An identifier capable of identifying a corresponding computer. Generally, a NetBIOS name of a local computer may be used as a server name. Accordingly, all computers using an MRS network should have a computer name which can be distinguished from other computers, and of which the length should be within 11 bytes. |

The multicast address and anycast addresses simply utilize a 15 byte length value. Accordingly, the multicast and anycast addresses may be readily set up and utilized between services. This value should be a unique value in the entire network and also known in advance.

The multicast/anycast address may be arranged as Table 5 below.

TABLE 5

| Type | Name | Description |
|---|---|---|
| BYTE | Cast type | In the case of a multicast address, defined as CT_MULTICAST. Also, in the case of an anycast address, defined as CT_ANYCAST. |
| BYTE (x15) | Service Name | An identifier capable of identifying a corresponding service. Multicast and anycast addresses do not designate a computer or a service, but are a virtual address system. Also, the service name is a unique value that can be identified in the entire MRS network. |

Examples of using an MRS network according to the present invention may include (1) the case of a service accessing the MRS network to utilize a function of other services and (2) the case of a service accessing the MRS network to provide a function of processing a matter requested from other services.

As an example of (1) the case of a service accessing the MRS network to use a function of other services, there may be a service sending a request to a login server to confirm user login information and receiving a response thereto. The service for utilizing a function provided by other services operates as shown below, via a connector which is a module for mediating the MRS network and the service.

Initially, when starting a process, a programming interface is initialized to transmit/receive data between the service and a connector. After registering a unicast address of the service in the MRS network, the service sends a request message to other services and receives a response message therefrom. Also, in the case of completing the use of the function provided by other services, the unicast address of the service is removed from the MRS network. When ending the process, the programming interface is also terminated.

As an example of (2) the case of a service accessing the MRS network to provide a function of processing a matter requested from other services, there may be a service providing a database reference function and a service providing a user's login information or location information. The service for providing a particular function to other services operates as shown below, via a connector which is a module for mediating the MRS network and the service.

Initially, when starting a process, a programming interface is initialized to transmit/receive data between the service and a connector. After registering a unicast address of the service in the MRS network, the service joins an anycast or multicast address with respect to a function to be provided. Also, the service receives a request message from other services and sends a response message thereto. Also, in the case of completing providing of the particular function to another service, the service leaves the joined anycast or multicast address. The unicast address of the service is removed from the MRS network. When ending the process, the programming interface is also terminated.

As described above, in the present invention, a connector may cause a service to register a unicast address thereof in an MRS network and join an anycast or multicast address according to a function to be provided, and also cause the service to leave the joined anycast or multicast address in the case of termination of the service.

Hereinafter, an operation process of a service, a connector and a broker which are subsystems of a communication network system according to the present invention and a method of adjusting a load between brokers will be described with reference to FIGS. 9 to 15.

Figure 9:
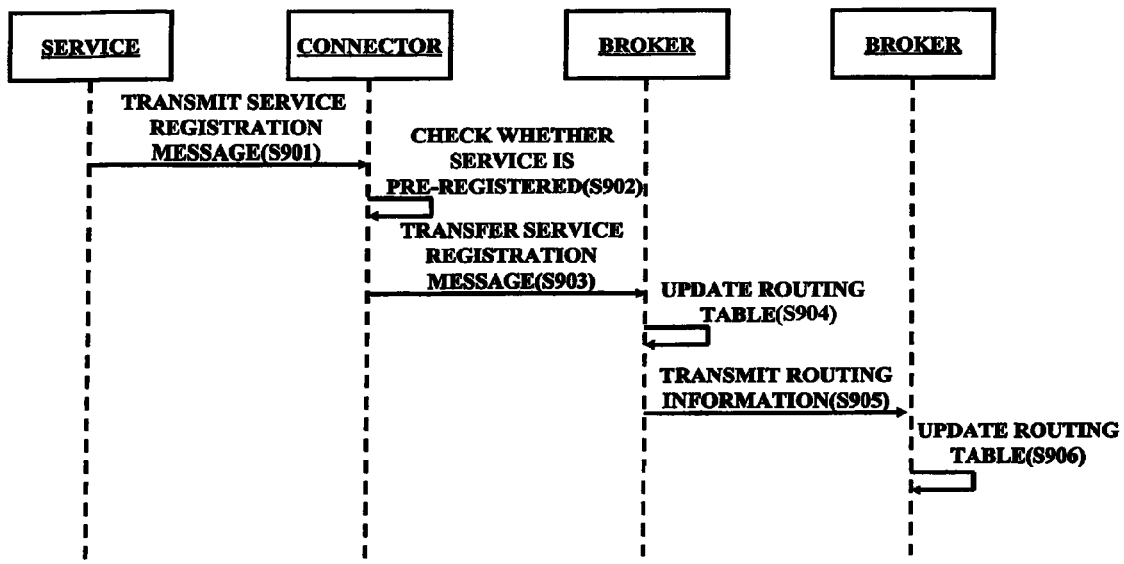
FIG. 9 is a flowchart illustrating a service registration process according to an embodiment of the present invention.

FIG. 9 is a flowchart illustrating a service registration process according to an embodiment of the present invention. A system that wants to provide a particular service or utilize a service in a communication network system according to the present invention should register the system itself in an MRS network.

According to an embodiment of the present invention, a load limit that designates a maximum number of connectors allowed to connect to each broker is set in each broker. A broker receives a connection request message from a connector and determines whether to connect to the connector by considering its current load and load limit. In this instance, the current load corresponds to a number of connectors currently connected to the broker.

A connector maintains a broker list recording a network address of each broker connected to each other in a full mesh topology. The network address may be an IP address of each broker.

In step S901, a service transmits a service registration message to a connector to register the service in an MRS network. In step S902, the connector receives the service registration message, analyzes the same and checks whether the service registration message is a pre-registered service. If the service is not pre-registered, the connector selects a broker to connect to the connector for transmission of the service registration message. In this instance, the connector may randomly select one broker from its broker list and transmit the connection request message to the selected broker.

The broker selected by the connector receives the connection request message and determines whether to connect to the connector by considering a number of connectors connected to the broker (i.e., a current load) and a maximum number of connectors connectable to the broker (i.e., a load limit). As an example, when the total number of connectors connected to the broker exceeds a load limit thereof, the selected broker may reject a connection request from the connector when a connection with the connector is being set up.

Also, in the case of rejection of the connection request, the connector may randomly select another broker, except for the selected broker, from its broker list and transmit the connection request message to the selected another broker.

When the broker determines that the connection with the connector is possible on the basis of its current load and load limit and authorizes a connection request of the connector, the connection between the broker and the connector is set up and the connector transmits the service registration message received from the service to the connected broker in step S903.

According to the present embodiment, a number of connectors connected to one broker is appropriately maintained. Also, a number of connectors connected to each broker in the entire network is balanced. Accordingly, a load balance between each broker is naturally adjusted.

In step 904, the broker adds routing information of the service having transmitted the service registration message, to its routing table. Also, in step 905, the broker transmits the routing information to other brokers. In step 906, other brokers update its routing information by using the received routing information.

As described above, in the present invention, a broker, in the case of updating its routing table, may transmit the updated routing information to other brokers constructing the MRS network and cause other brokers to maintain latest routing information all the times.

Figure 10:
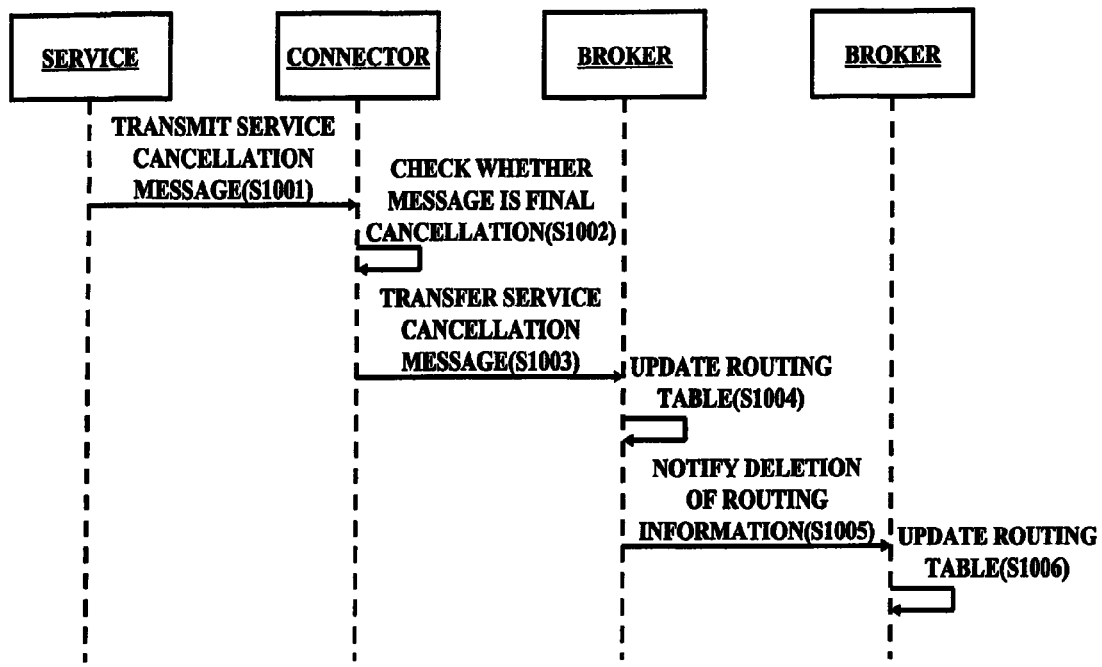
FIG. 10 is a flowchart illustrating a service cancellation process according to an embodiment of the present invention.

FIG. 10 is a flowchart illustrating a service cancellation process according to an embodiment of the present invention. A system that has registered in the system itself in an MRS network performs a service cancellation process via a connector, to remove the system itself from the MRS network. After performing the service cancellation process, all service requests via the MRS network are blocked.

In step 1001, a service transmits a service cancellation message to a connector. In step 1002, the connector analyzes the service cancellation message to check whether the same is a final cancellation. In step 1003, in the case of the final cancellation, the connector transfers the service cancellation message to a broker.

In step S1004, the broker deletes routing information of the service having transmitted the service cancellation message, from its routing table and updates its routing table. In step S1005, the broker notifies other brokers of deletion of the routing information. In step S1006, other brokers receive the notice, detect deletion of the routing information, and update their own routing table.

Figure 11:
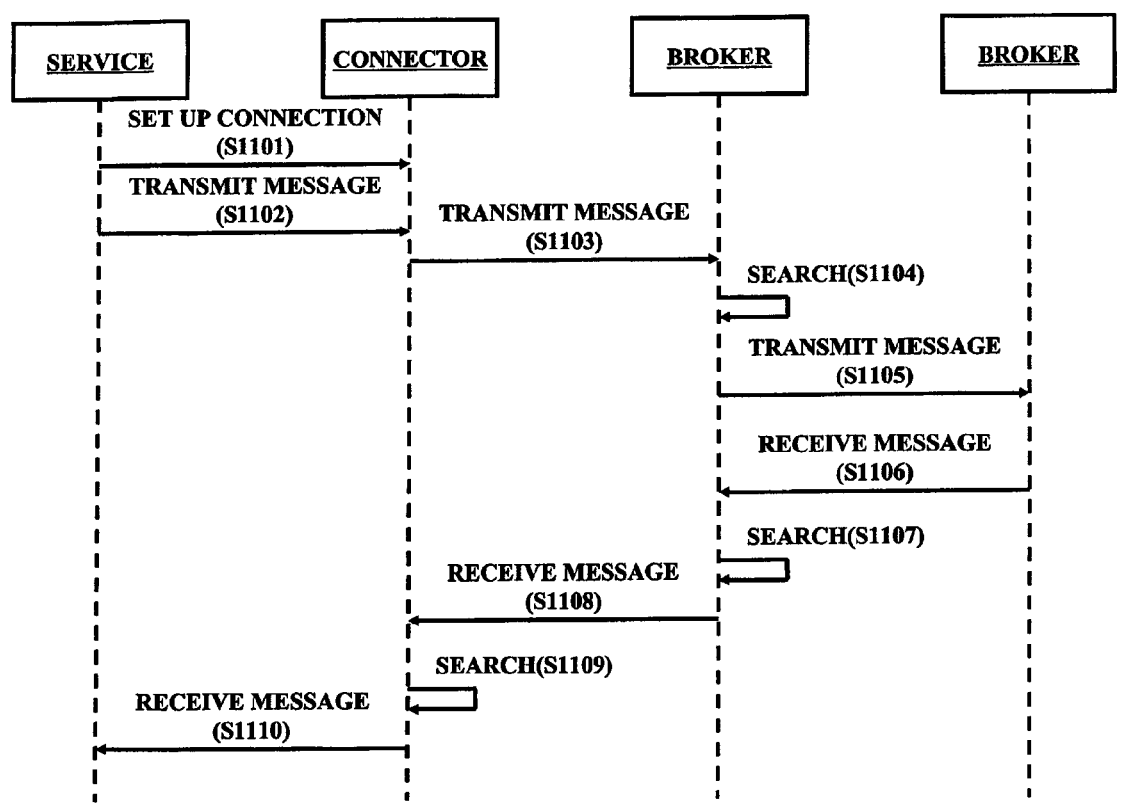
FIG. 11 is a flowchart illustrating a message transmitting/receiving process according to an embodiment of the present invention.

FIG. 11 is a flowchart illustrating a message transmitting/receiving process according to an embodiment of the present invention. Namely, FIG. 11 illustrates a process of transmitting a message to a service to utilize the service, or receiving a message which requests a service.

In step S1101, a service that wants to utilize a particular service transfers a connection message to a connector, and sets up a virtual connection with the connector. In this case, an address of a desired service is designated.

In step S1102, the service transmits a message by using a programming interface of the connector. In step S1103, the connector adds a Message Routing Protocol (MRP) Header according to MRP to the message transmitted from the service and transmits a corresponding message to a broker connected to the connector. In this instance, MRP is used in the MRS network. In step S1104, the broker searches for a destination of the message received from the connector. In step S1105, the broker transmits the message to a corresponding broker or a corresponding connector.

In step S1106, the broker receives a message from another broker. In step S1107, the broker searches for a destination of the received message. In step S1108, the broker transmits the message to a corresponding connector. In step S1109, the connector removes the MRP Header from the transmitted message and searches for a destination address and instance of the transmitted message. In step S1110, the message is transmitted to a corresponding service and the corresponding service receives the message.

In a communication network system according to the present invention, messages transferred to a broker via a connector through the aforementioned process are transparently transmitted/received to other brokers or connectors. Also, in the communication network system, a message transferred by a particular service may be transparently transmitted/received via a routing path, between brokers provided in the routing path.

Figure 12:
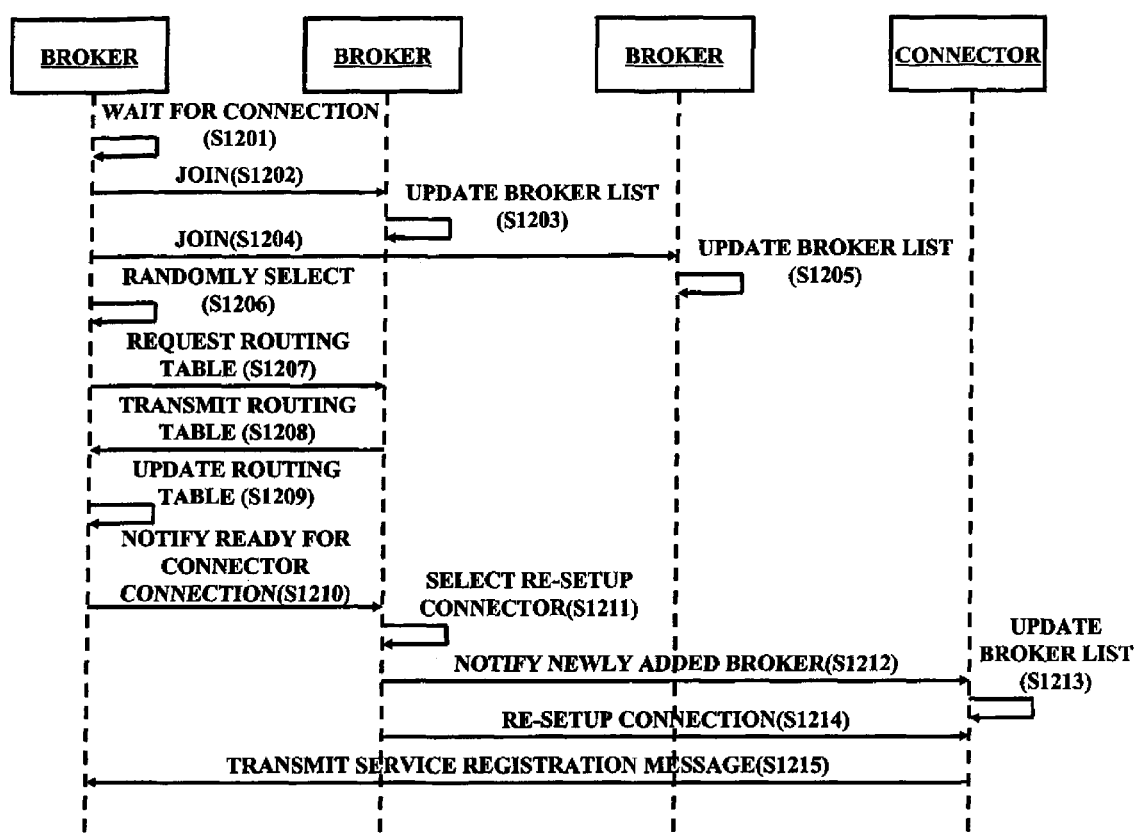
FIG. 12 is a flowchart illustrating a process of newly adding a broker in an MRS network, in an embodiment of the present invention.

FIG. 12 is a flowchart illustrating a process of adding a new broker in an MRS network, in an embodiment of the present invention.

In step S1201, an additional broker is waiting for other brokers to be connected first. In step S1202, the broker is connected to other brokers that are being implemented. In step S1203, brokers connected to the additional broker add the same to their broker list and update the same. In the same manner, in step S1204, the additional broker is connected to other brokers that are being implemented. In step S1205, broker lists of the other brokers are also updated. As described above, broker lists of all brokers that are being implemented in the MRS network may be updated.

In step S1206, the additional broker is connected to all brokers that are being implemented, and randomly selects any one of the brokers. In step S1207, the additional broker requests the selected broker for a routing table and, in step S1208, receives the same. In step S1209, the additional broker reflects the received routing table to its routing table. In step S1210, the additional broker notifies other brokers that the additional broker itself is ready for a connection with a connector.

In step S1211, a broker receives the notice and counts a number of re-setup connectors to be moved to the new broker among its connectors connected to the broker and selects the same number of connectors as the counted number. Also, in step S1212, the broker having received the notice notifies all connectors connected to the broker itself that the new broker has been connected. In step S1213, all connectors having received the notice add the new broker to a broker list recording brokers connected to the broker itself.

In step S1214, a message informing to re-setup a connection with the new broker is transferred to the selected re-setup connectors. In step S1215, the connectors having received the message are connected to the new broker and transfer a service registration message with respect to services connected to the connectors, to the new broker.

The steps of S1210 to S1215 may be performed with respect to all brokers that are being implemented in the MRS network. Also, through the aforementioned process, a certain portion of connectors connected to a broker that is being implemented and services connected to the connectors may be moved to the additional broker in the MRS network. Accordingly, load may be efficiently distributed between brokers.

Figure 13:
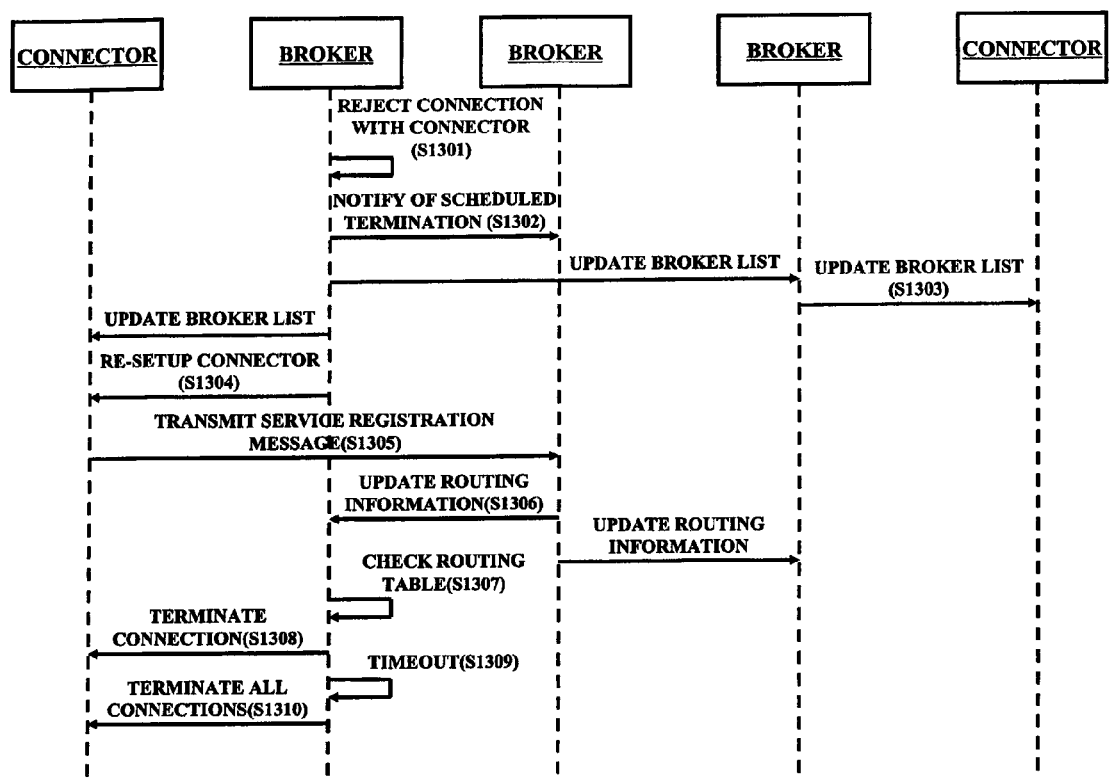
FIG. 13 is a flowchart illustrating a process of a load adjusting method performed in the case of a normal termination process of a broker, in an embodiment of the present invention.

FIG. 13 is a flowchart illustrating a process of a load adjusting method performed in the case of a normal termination process of a broker, in an embodiment of the present invention.

In step S1301, a first broker to be normally terminated from a communication network system according to the present invention sets itself so that a connector may no longer connect to the first broker. In step S1302, the first broker transmits scheduled termination information to other brokers, informing that the first broker will be terminated. In step S1303, the first broker and other brokers having received the scheduled termination information transmit the same to their connected connectors and notify the connectors that the first broker will be normally terminated.

In step S1304, the first broker selects a second broker which is one of other brokers connected to the first broker in a full mesh topology and transmits a connection re-setup message to a connector connected to the first broker to re-setup a connection with the second broker.

In step S1305, the connector connected to the first broker receives the connection re-setup message and transmits a service registration message to the second broker. In this instance, the service registration message is to set up a connection with the second broker and register services connected to the connector in the second broker.

Also, according to an embodiment of the present invention, a broker state message is exchanged among all brokers connected to each other in a full mesh topology in an MRS network. The broker state message includes information on a number of connectors currently connected to each broker (i.e., a current load) and a maximum number of connectors connectable to the each broker (i.e., a load limit).

Namely, the broker state message is exchanged among brokers and includes information on a current state and a maximum capacity of each broker. Accordingly, when selecting the second broker, the first broker may select the second broker on the basis of a current load and load limit of each broker contained in the broker state message.

According to the present embodiment, while a connector connected to a broker that is normally terminated is dynamically connected to another broker, an unnecessary procedure such as a broker of which connectors are exceeding a load limit rejecting the connector's request for a connection and the connector requesting another broker for re-setup of a connection therewith may be omitted.

In step S1306, the second broker connected with a connector because of the normal termination of the first broker updates its routing information and transmits the updated routing information to the first broker and other brokers.

As described above, when a broker updates its routing information, the broker transmits the updated routing information to other brokers constructing an MRS network, to enable the other brokers to maintain latest routing information at all times.

In step S1307, the normally terminating first broker receives the updated routing information from the second broker, updates its routing table by using the updated routing information and determines whether routing information associated with the updated target (i.e., connectors connected to the first broker) is contained in its routing table. In step S1308, when routing information associated with the updated target is not contained, the first broker finally terminates the connection.

In step S1309, the normally terminating first broker checks whether a predetermined time passes from transmission of a connection re-setup message requesting connectors connected to the first broker to re-setup the connection with the second broker. In step S1310, when there are still connectors connected to the first broker even after the predetermined time passes, the normally terminating first broker terminates the connection with all connectors and terminates the first broker itself.

In the present invention, a load balance between brokers may be automatically adjusted by dynamically moving services connected to each connector to another broker in the case of normal termination of a broker through the aforementioned process.

Figure 14:
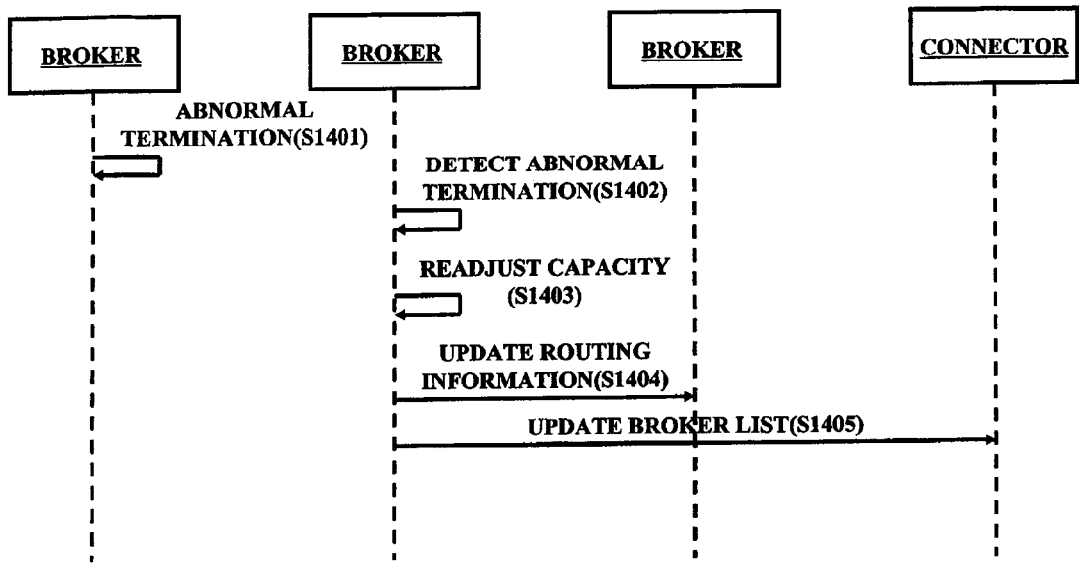
FIG. 14 is a flowchart illustrating a process of a load adjusting method performed in the case of other brokers detecting abnormal termination of a broker, in an embodiment of the present invention.

FIG. 14 is a flowchart illustrating a process of a load adjusting method performed in the case of other brokers detecting abnormal termination of a broker, in an embodiment of the present invention.

In step S1401, a first broker is abnormally terminated in a communication network system according to the present invention, because of a system error and the like. In step S1402, a second broker detects the abnormal termination of the first broker. In this instance, the second broker is one of other brokers connected to the first broker in a full mesh topology. In step S1403, the second broker increases its load limit, i.e., a maximum capacity.

A maximum number of connectors connectable to one broker, as an example, 50, is the broker's load limit. When another broker detects abnormal termination of a broker, the another broker may increase its maximum number of connectors connectable to one broker to 60, and operate to enable connectors connected to the abnormally terminating broker to quickly move to other brokers and connect therewith. In this case, a service disconnection time may be significantly reduced.

According to an embodiment of the present invention, a broker state message including information on a current state of each broker is exchanged among all brokers connected to each other in a full mesh topology in an MRS network.

In the present embodiment, the broker state message may be utilized as a reference enabling each broker to determine whether another broker is in a normal state or in an abnormal state. Also, when the second broker detects the first broker that is abnormally terminated from a communication network system according to the present invention, the second broker may detect the first broker not receiving the broker state message normally as an abnormally terminating broker.

Also, the second broker having detected abnormal termination of the second broker sets up a connection with one portion of connectors among connectors connected to the first broker. Accordingly, services connected to the one portion of connectors operate to be registered in the second broker.

According to an embodiment of the present invention, in setting up the connection with the one portion of connectors, the second broker may determine a number of the one portion of connectors according to a value obtained by dividing a number of connectors connected to the first broker by the total number of brokers of the MRS network, excluding the first broker. As an example, when, excluding the abnormally terminating first broker, two brokers are contained in the MRS network and a number of connectors connected to the first broker is N, "N/2" connectors may be connected to the second broker.

According to the present embodiment, although a broker is abnormally terminated because of a system error and the like, a number of connectors connected to one broker is appropriately maintained. Also, a number of connectors connected to each broker in the entire network is balanced. Consequently, a load balance between each broker may be naturally adjusted.

In step S1404, the second broker updates its routing information according to the setup of connections and transmits the updated routing information to other brokers in the MRS network to enable the other brokers to update their routing table.

In step S1405, termination information informing termination of the first broker is transmitted to connectors connected to all brokers in the MRS network and the connectors may update their broker list.

In the present invention, a load balance between brokers may be automatically adjusted by dynamically moving services connected to each connector to another broker in the case of normal termination of a broker through the aforementioned process.

Figure 15:
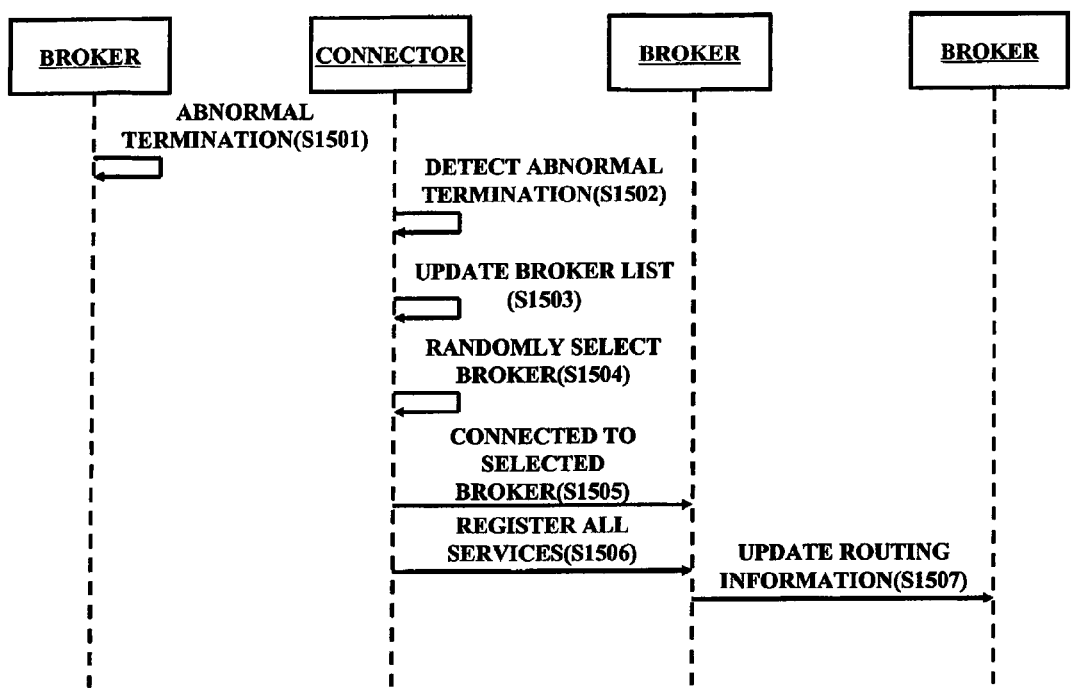
FIG. 15 is a flowchart illustrating a process of a load adjusting method performed in the case of a connector detecting abnormal termination of a broker, in an embodiment of the present invention.

FIG. 15 is a flowchart illustrating a process of a load adjusting method performed in the case of a connector detecting abnormal termination of a broker, in an embodiment of the present invention.

A connector maintains a broker list recording a network address of each broker connected to each other in a full mesh topology. The network address may be an IP address of each broker.

In step S1501, a first broker is abnormally terminated from a communication network system according to the present invention. In step S1502, a connector connected to the first broker detects abnormal termination of the first broker. In step S1503, the connector deletes a network address of the first broker from its broker list and updates the same.

In step S1504, the connector having deleted the abnormally terminated first broker from its broker list randomly selects a second broker from its updated broker list.

In step S1505, the connector sets up a connection with the second broker. In step S1506, the connector may register all services connected to the connector by transmitting a service registration message to the second broker.

In step S1507, the second broker registered with the additional services updates its routing information and transmits the same to other brokers in the MRS network to enable all brokers to maintain latest routing information.

In the present invention, a load balance between brokers may be automatically adjusted by both a broker and a connector connected to an abnormally terminated broker detecting the abnormal termination of the broker and by dynamically moving services connected to each connector to other broker, in the case of abnormal termination of a broker through the aforementioned process.

Hereinafter, a structure of a connector which is a subsystem of a communication network system according to the present invention and a function of each component will be described.

Figure 16:
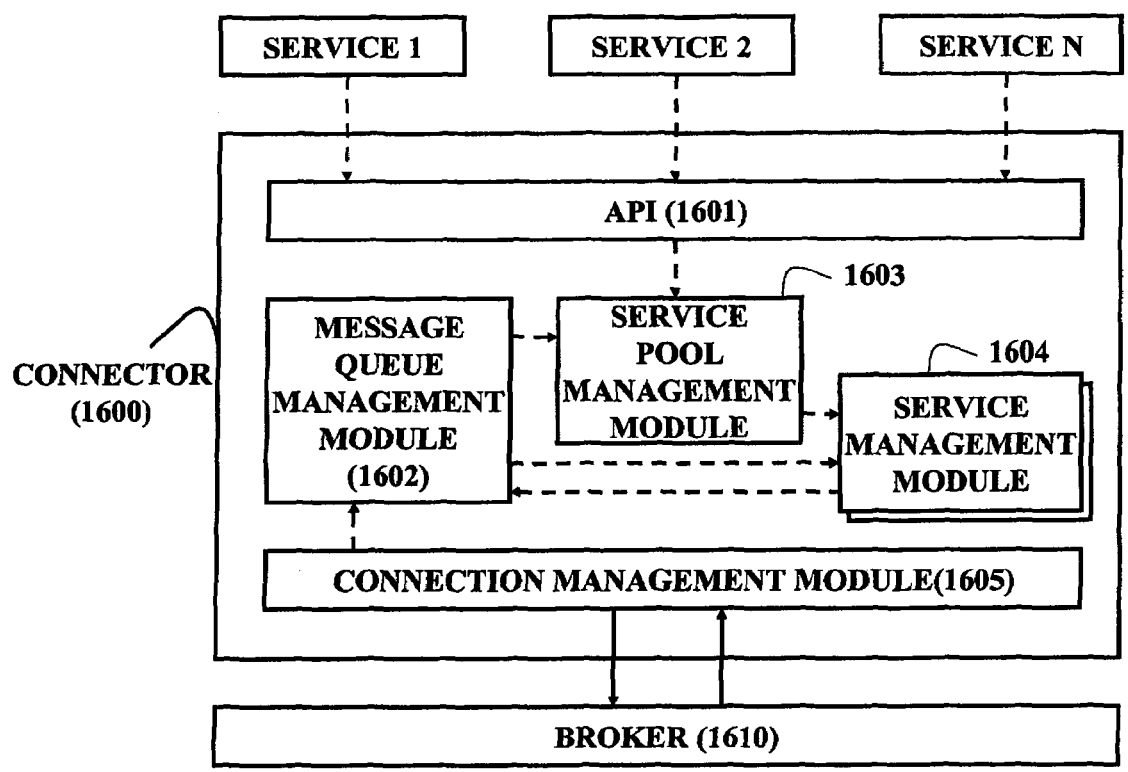
FIG. 16 is a block diagram illustrating a structure of a connector according to the present invention.

FIG. 16 is a block diagram illustrating a structure of a connector according to the present invention.

As illustrated in FIG. 16, a connector 1600 includes an API 1601, a message queue management module 1602, a service pool management module 1603, a service management module 1604 and a connection management module 1605.

The API 1601 is an Application Programming Interface which exposes a function of the connector 1600 to a service connected to the connector 1600. A system that wants to utilize an MRS network according to the present invention uses the API 1601 and transmits/receives data.

Figure 17:
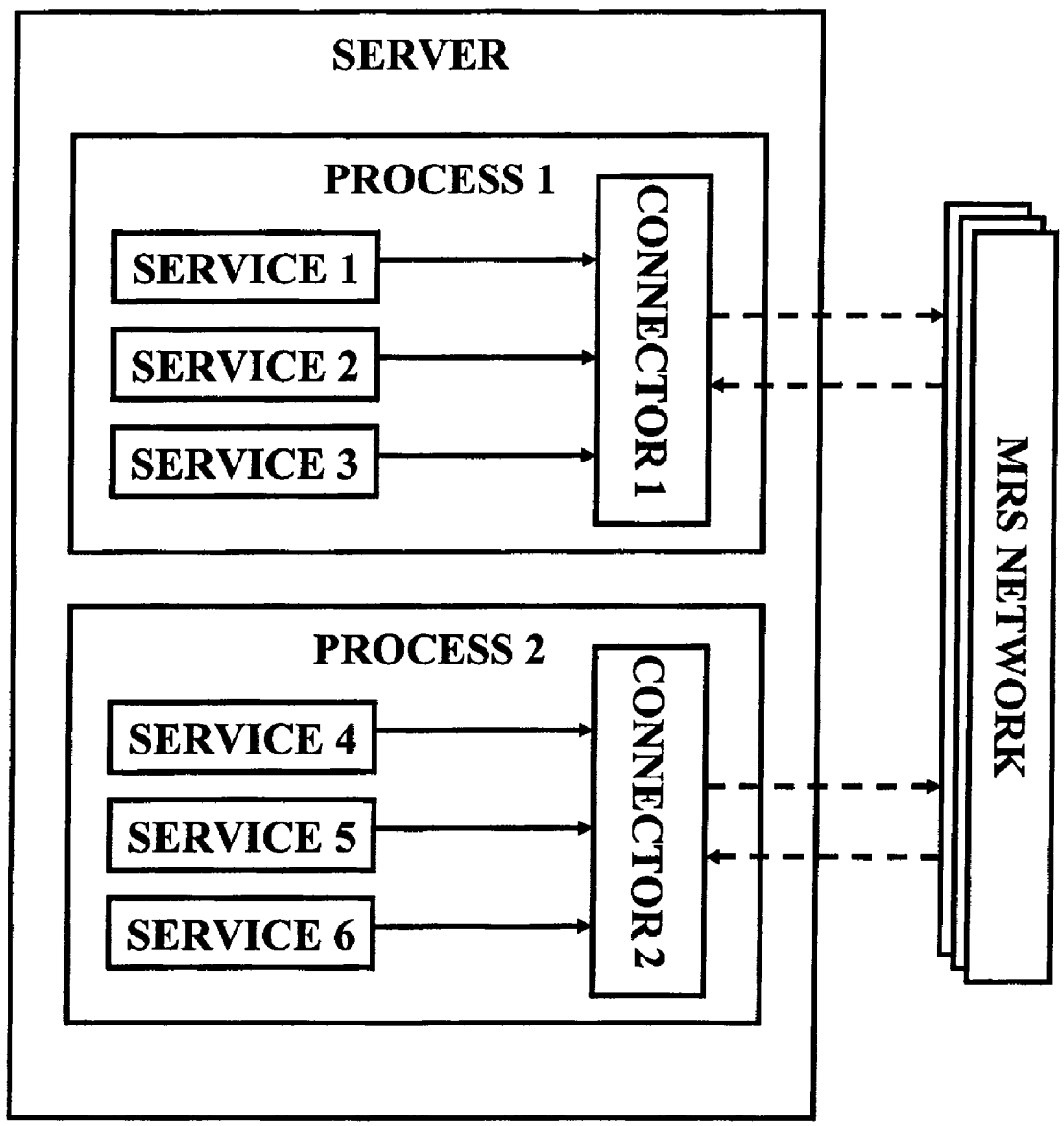
FIG. 17 is a diagram illustrating an Application Programming Interface (API) which is programming interface provided from a connector according to the present invention.

FIG. 17 is a diagram for explaining the API 1601 and a relationship with respect to a process of a service and a connector.

As illustrated in FIG. 17, according to an embodiment of the present invention, a connector and a service are contained in an identical process. Only one connector may be contained in one process and at least one service may be contained in one process. Namely, one connector is contained in each process and the connector may mediate a connection between all services connected to the connector and the broker constructing an MRS network.

According to the present embodiment, a communication network system may be unified by matching a connector and a process 1:1. Also, inefficient routing may be prevented. In this instance, the inefficient routing occurs when connecting services contained in different processes to the same broker via one connector. Also, complexity in transmitting/receiving data may be prevented.

As illustrated in FIG. 17, at least one service contained in one process may be connected to an MRS network via one connector 1600. In this case, a connection and data transmitting/receiving between services and the connector 1600 may be performed via the API 1601.

Namely, to transmit/receive data by using the MRS network, the service may not directly set up a connection with the MRS network to transmit/receive data. The service transmits/receives data by using the API 1601 provided from the connector 1600. As a result, the API 1601 receives a request for registration or cancellation of a service, and a request for transmission of data to the broker 1610, from the service.

The connector 1600 is a module for providing the API 1601. Also, the connector 1600 is loaded in each process using the MRS network and functions to transmit/receive a message to the MRS network, with respect to all services generated in a corresponding process.

The message queue management module 1602 functions to manage an MRP packet used in the MRS network according to the present invention. In this instance, the MRP packet is a unit of data transmitted/received between the connector 1600 and the broker 1610.

Figure 18:
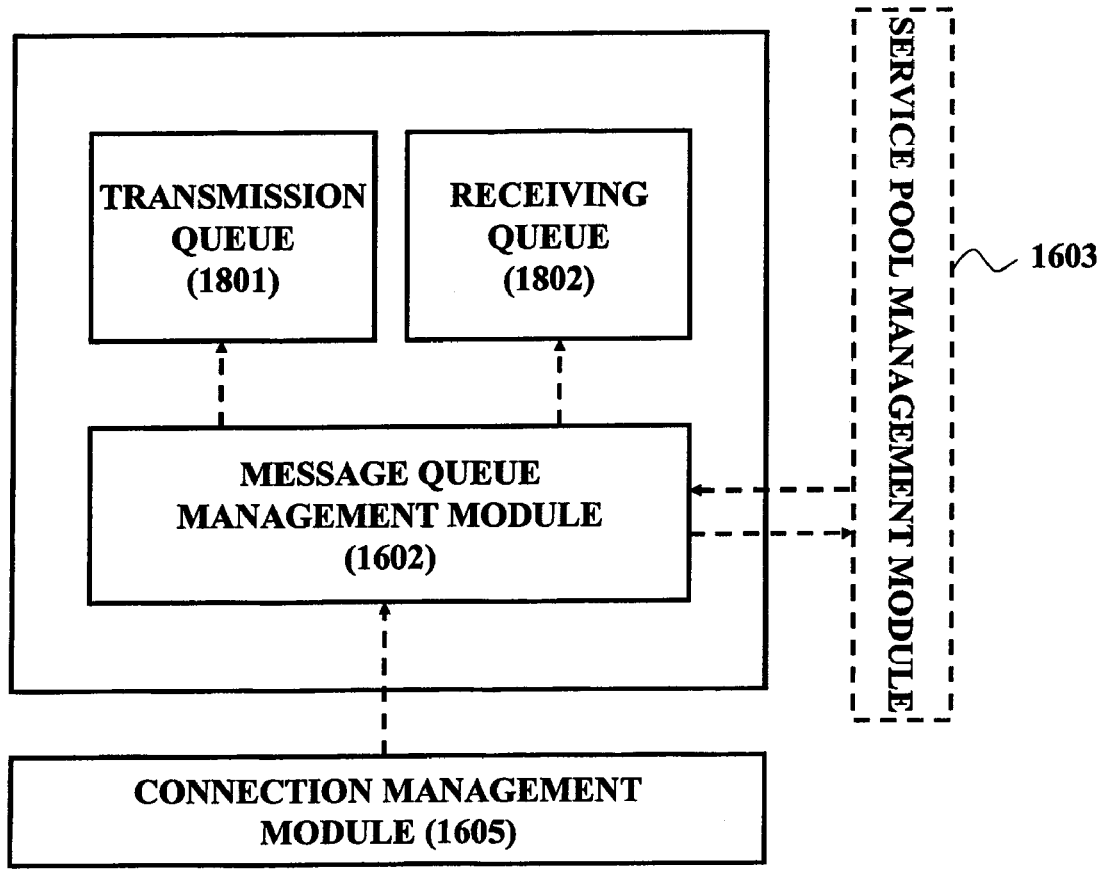
FIG. 18 is a block diagram illustrating a structure of a message queue management module which is one component of a connector according to the present invention.

FIG. 18 is a block diagram illustrating a structure of the message queue management module 1602.

As illustrated in FIG. 18, the message queue management module 1602 may include a transmission queue 1801 and a receiving queue 1802.

In this instance, the transmission queue 1801 functions to manage an MRP packet to be transmitted to the broker 1610, and the receiving queue 1802 functions to manage an MRP packet received from the broker 1610.

The service pool management module 1603 functions to register a service in the broker 1610 or remove the service from the broker, and to manage the registered service. The service management module 1604 functions to manage information on the registered service.

Figure 19:
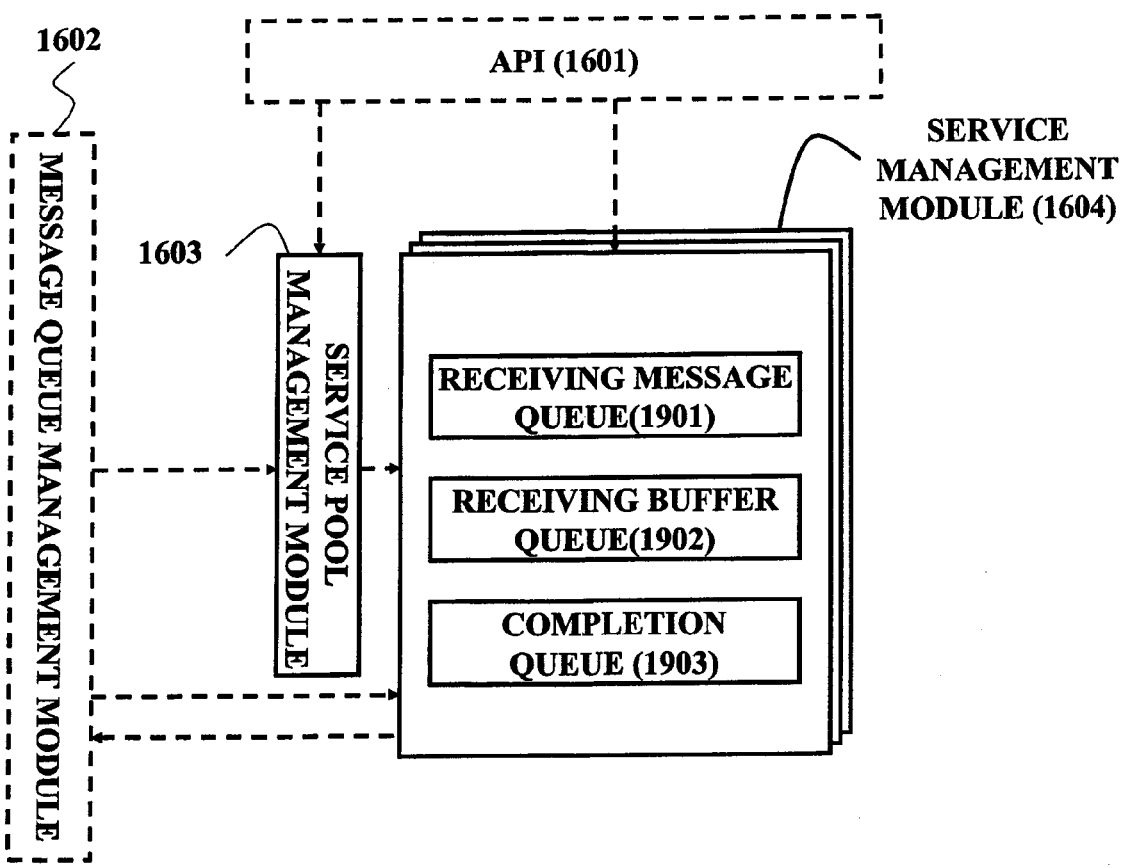
FIG. 19 is a block diagram illustrating a structure of a service management module which is one component of a connector according to the present invention.

FIG. 19 is a block diagram illustrating a structure of the service management module 1604.

As illustrated in FIG. 19, the service management module 1604 may include a receiving message queue 1901, a receiving buffer queue 1902 and a completion queue 1903.

In this instance, the receiving message queue 1901 functions to manage a received message from the broker 1610. The receiving buffer queue 1902 functions to manage a receiving buffer registered by the service. The completion queue 1903 functions to manage completed results with respect to input/output requested from the service.

The connection management module 1605 functions to transmit/receive an MRP packet and manage a socket connection with the broker 1610.

Figure 20:
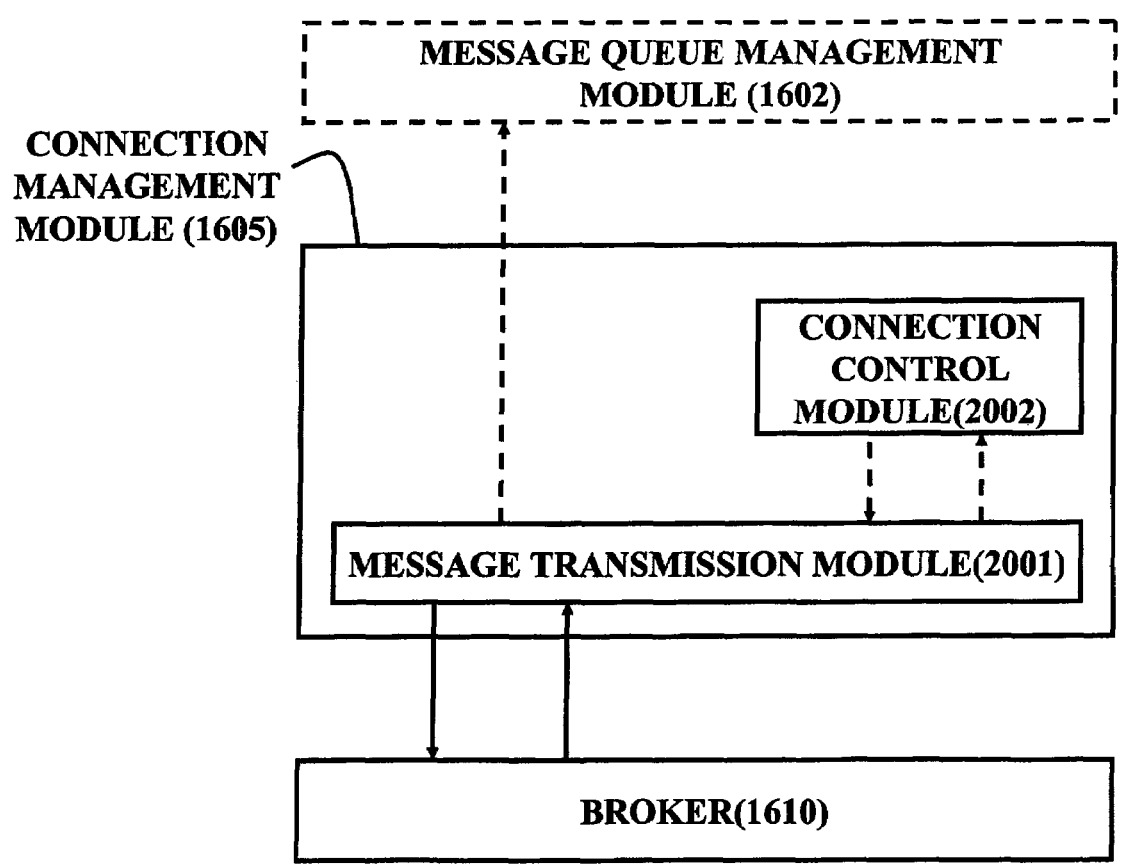
FIG. 20 is a block diagram illustrating a structure of a connection management module which is one component of a connector according to the present invention.

FIG. 20 is a block diagram illustrating a structure of the connection management module 1605.

As illustrated in FIG. 20, the connection management module 1605 may include a message transmission module 2001 and a connection control module 2002.

In this instance, the message transmission module 2001 functions to load an MRP packet to be transmitted from the message queue management module 1602 and transmit the same to the broker 1610 and to transfer an MRP packet received from the broker 1610 to the message queue management module 1602. Also, the connection control module 2002 functions to process a control message between the connector 1600 and the broker 1610 and control a connection therebetween.

Hereinafter, a structure of a broker, which is another subsystem of a communication network system according to the present invention, and a function of each component will be described.

Figure 21:
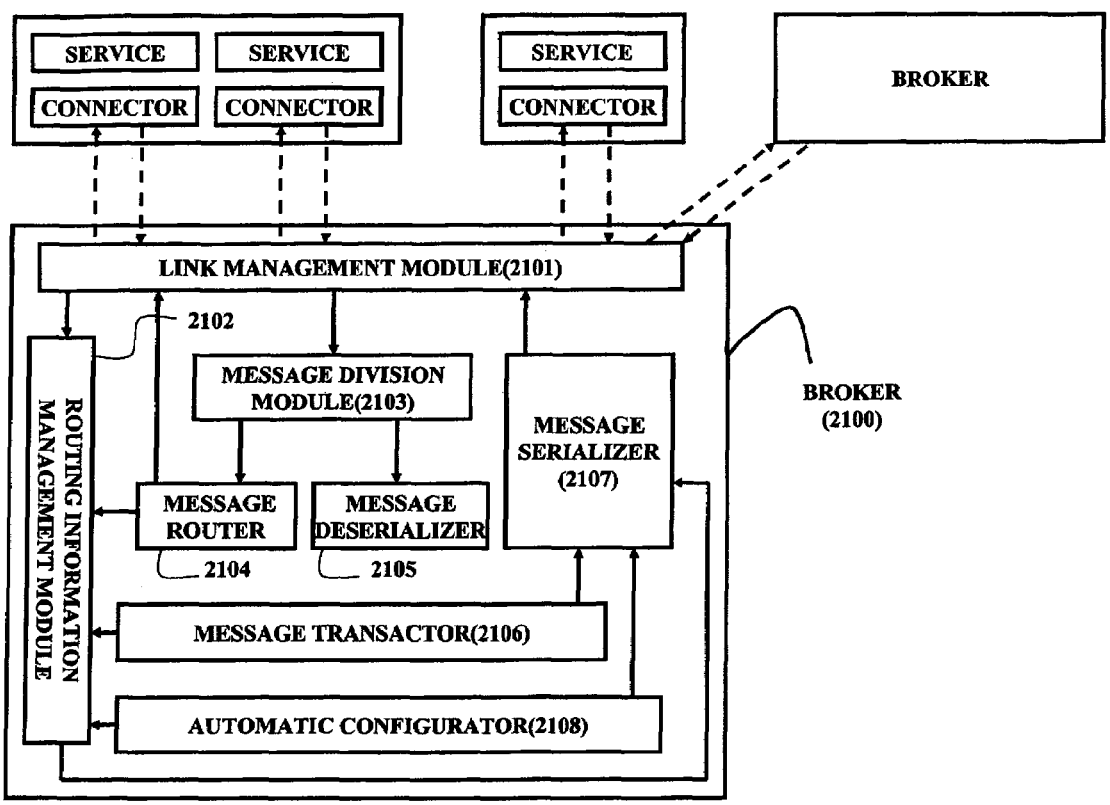
FIG. 21 is a block diagram illustrating a structure of a broker according to the present invention.

FIG. 21 is a block diagram illustrating a structure of a broker.

As illustrated in FIG. 21, a broker 2100 may include a link management module 2101, a routing information management module 2102, a message division module 2103, a message router 2104, a message deserializer 2105, a message transactor 2106, a message serializer 2107 and an automatic configurator 2108.

The link management module 2101 functions to maintain and manage a connection with a connector or other broker, and also to transmit/receive data with the connector or other broker.

The routing information management module 2102 functions to maintain and manage routing information of a service registered in the broker 2100. Also, the routing information management module 2102 may maintain a connection pool including connection information with a connector connected to the broker 2100 or other brokers.

The message division module 2103 functions to understand a type of data received in the link management module 2101 and divide the received data into a simple message and a complex message according to a predetermined standard.

The message router 2104 functions to receive the simple message from the message division module 2103, obtain location information of a destination associated with the simple message, from the routing information management module 2102, and transfer the obtained location information to the link management module 2101.

The message deserializer 2105 functions to receive the complex message from the message division module 2101 and convert the received complex message into an object.

The message transactor 2106 functions to receive the object from the message deserializer 2105 and control the broker 2100 by using the object.

The message serializer 2107 functions to receive the object from the message transactor 2106, process the object into transmittable linear data, and transfer the same to the link management module 2101.

The automatic configurator 2108 functions to track a status of a network containing the broker 2100 and automatically adjust the status of the broker 2100.

Figure 22:
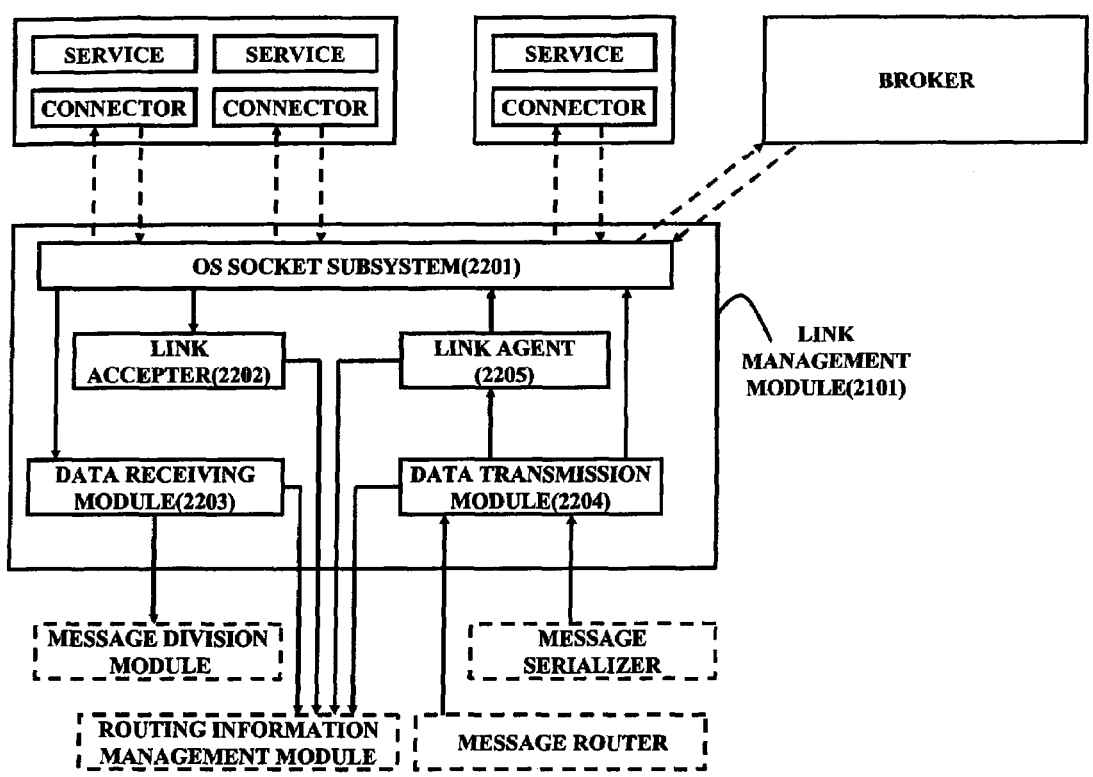
FIG. 22 is a block diagram illustrating a structure of a link management module which is one component of a broker according to the present invention.

FIG. 22 is a block diagram illustrating a structure of the link management module 2101.

As illustrated in FIG. 22, the link management module 2101 may include an OS socket subsystem 2201, a link accepter 2202, a data receiving module 2203, a data transmission module 2204 and a link agent 2205.

The OS socket subsystem 2201 functions as interface for transmitting/receiving data with a connector connected to the broker 2100 or other broker.

The link accepter 2202 functions to receive a connection request from the connector connected to the broker 2100 or other broker via the OS socket subsystem 2201 and record connection information according to the connection request in the connection pool maintained by the routing information management module 2102.

The data receiving module 2203 functions to receive data from the connector connected to the broker 2100 or other brokers and transfer the data to the message division module 2103.

The data transmission module 2204 functions to receive processed data from the message serializer 2107 and transmit the processed data to the connector connected to the broker 2100 or other brokers.

The link agent 2205 functions to attempt a connection with the connector connected to the broker 2100 or another broker via the OS socket subsystem 2201 according to a request from the data transmission module 2204, and in the case of a successful connection, update the connection pool maintained by the routing information management module 2102 by using connection information.

Also, the data transmission module 2204 may check whether a connection with another broker or a connector associated with a destination of data to be transmitted is set up by referring to the connection pool. In the case the connection not set up, the data transmission module 2204 may operate to attempt data transmission after requesting the link agent 2205 to set up a connection with a connector connected to the broker or another broker.

The load adjusting method according to the present invention includes computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, there is provides a load adjusting method in which a load balance between brokers is automatically adjusted by selecting a broker to be registered with a service via a connector on the basis of each broker's current load and load limit, and dynamically moving services connected to each connector to other brokers, in the case of normal and abnormal termination of a broker, in a new communication network system having a simple connection structure between servers by using a bus network structure.

Also, according to the present invention, there is provided a load adjusting method which can support service extendibility and performance enhancement, easily maintain and manage a connection structure, and construct a communication network system, by effectively distributing a load among subsystems in the communication network system having a simple connection structure between servers by using a bus network structure.

Also, according to the present invention, there is provided a load adjusting method in which a communication network structure can deviate from a network structure according to the conventional art connecting all game servers in a mesh topology, simplify and easily manage a connection structure between servers, and efficiently extend services.

The invention claimed is:

1. A computer-implemented method for adjusting a load balance among systems in a communication network, the method comprising:
    establishing a communication network by connecting a plurality of brokers to one another in a mesh topology, wherein each of the brokers is configured to route a message and a plurality of service terminal nodes are connected to the brokers in a bus topology via one or more connectors,
    wherein the one or more connectors are configured to mediate a connection between any one of the brokers and the service terminal nodes, the mediation further comprising:
        maintaining a broker list in the one or more connectors wherein the broker list comprises a network address of each broker,
        transmitting a request to register the service terminal node with a broker,
        determining whether to connect the any one of the brokers to the each set of the service terminal nodes based, at least in part, upon a current load and a load limit of each broker,
        selecting a broker from the broker list based on the determination,
        transmitting a connection request to the selected broker,
        transmitting scheduled termination information from the first broker to each of the brokers; and
        terminating the connection between the first broker and the one or more connectors in response to detection of the one or more connectors maintaining the connection with the first broker after a threshold time starting from receiving transmission of a connection re-establish request.

2. The method of claim 1, further comprising:
    determining whether to reject a connection request between the any one of the brokers and the service terminal nodes in response to detection of a total number of connectors to be connected to the selected broker being in excess of a threshold load limit.

3. The method of claim 2, further comprising:
selecting another broker from the broker list and transmitting a second connection request to the another broker, in response to the determination that the connection request to the selected broker is rejected.

4. A computer-implemented method for controlling a load balance among systems in a communication network, the method comprising:
establishing a communication network by connecting a plurality of brokers comprising a first broker and a second broker to each other in a mesh topology, each of the brokers being configured to route a message, and a plurality of service terminal nodes are connected to the brokers in a bus topology via one or more connectors,
wherein the one or more connectors are configured to mediate a connection between any one of the brokers and the service terminal nodes;
selecting, by the first broker, the second broker among the brokers in response to detection of the first broker being terminated from the communication network;
transmitting a request for re-establishing a connection with respect to the selected second broker to an each set of the service terminal nodes connected to the first broker;
transmitting, to the second broker, a request to register at least one service terminal node being connected to the first broker;
transmitting scheduled termination information from the first broker to each of the brokers; and
terminating the connection between the first broker and the one or more connectors in response to detection of the one or more connectors maintaining the connection with the first broker after a threshold time starting from receiving transmission of a connection re-establish request.

5. The method of claim 4, further comprising:
updating a routing information of the second broker; and
transmitting the updated routing information to the other brokers.

6. The method of claim 5, further comprising:
updating a routing table in the first broker with the updated routing information from the second broker;
determining whether routing information associated with the connector is provided in the updated routing table of the first broker; and
terminating the connection with the connector in response to determining the routing information associated with the connector is not provided.

7. The method of claim 4, further comprising:
exchanging a message comprising information associated with a current load and a load limit of each broker between the first broker and each of the other brokers, wherein the first broker selects the second broker based, at least in part, upon the exchanged message.

8. A computer-implemented method for providing a load balance among systems in a communication network, the method comprising:
establishing a communication network by connecting a plurality of brokers comprising a first broker and a second broker to each other in a mesh topology, each of the brokers being configured to route a message, and a plurality of servers for providing a plurality of services are connected to the brokers in a bus topology via one or more connectors,
wherein the one or more connectors are configured to mediate a connection between the brokers and the services;
detecting whether a first broker abnormally being terminated from the communication network, wherein the abnormal termination of the first broker is detected by a second broker;
re-establishing a connection of the second broker to the each set of service terminal nodes in response to detection of termination from the first broker, wherein the connection uses the bus network topology;
transmitting scheduled termination information from the first broker to each of the brokers;
terminating the connection between the first broker and the one or more connectors in response to detection of the one or more connectors maintaining the connection with the first broker after a threshold time starting from receiving transmission of a connection re-establish request;
updating routing information of the second broker according to the connection; and
transmitting the updated routing information to the other brokers.

9. The method of claim 8, wherein connecting the second broker to at least one of connectors being connected to the first broker comprises determining a number of connectors based upon a value obtained by dividing a number of connectors connected to the first broker by the total number of the plurality of brokers excluding the first broker.

10. The method of claim 8, further comprising:
transmitting termination information of the first broker to a connector connected to each of the brokers; and
updating a broker list in the connector.

11. The method of claim 8, further comprising:
exchanging a message containing information of a current status of the respective brokers associated with the first broker and each of the other brokers, wherein the second broker detects the first broker in response to detection of the message is not being received normally.

12. A computer-implemented method for adjusting a load among systems in a communication network, the method comprising:
establishing a communication network by connecting a plurality of brokers comprising a first broker and a second broker in a mesh topology, wherein each of the brokers is configured to route a message among a plurality of service terminal nodes that are coupled to the brokers in a bus topology via one or more connectors,
wherein the one or more connectors is configured to mediate a connection between the first broker and the service terminal nodes, and the mediation further comprises,
maintaining a broker list in the one or more connectors, wherein the broker list comprises a network address of the first broker,
detecting an abnormal termination of the first broker from the communication network system, wherein the abnormal termination of the first broker is detected by the one or more connectors,
transmitting scheduled termination information from the first broker to each of the brokers,
terminating the connection between the first broker and the one or more connectors in response to detection of the one or more connectors maintaining the connection with the first broker after a threshold time starting from receiving transmission of a connection re-establish request, updating the broker list by deleting a network address of the first broker from the broker list in the any one of the one or more connectors, selecting a second broker from the updated broker list, and connecting the second broker to the each set of the service terminal nodes.

13. The method of claim 12, further comprising:

updating a routing information of the second broker; and transmitting the updated routing information to the other brokers.

14. The method of claim 12, wherein the respective brokers is connected to each connector, each service terminal node is connected to each broker via one connector, and the connector and the service terminal node are contained in an identical process.

15. The method of claim 14, wherein one connector is contained in one process and at least one service is contained in the one process.

16. A non-transitory computer readable record medium comprising an executable program, which when executed by a processor of the computer, performs the method of claim 12.

17. The method of claim 1, wherein one broker is connected to each connector, each of the plurality of service terminal nodes is connected to the broker via one connector, and the connector and the service terminal nodes are contained in an identical process.

18. A non-transitory computer readable record medium comprising an executable program, which when executed by a processor of the computer, performs the method of claim 1.

19. The method of claim 4, wherein one of the brokers is connected to a connector, each of the plurality of service terminal nodes is connected to the broker via the connector, and the connector and the service terminal nodes are configured in an identical process.

20. A non-transitory computer readable record medium comprising an executable program, which when executed by a processor of the computer, performs the method of claim 4.

21. The method of claim 8, wherein one of the brokers is connected to a connector, each of the plurality of service terminal nodes is connected to the broker via the connector, and the connector and the service terminal nodes are configured in an identical process.

22. A non-transitory computer readable record medium comprising an executable program, which when executed by a processor of the computer, performs the method of claim 8.

* * * * *